United States Patent
Whitney et al.

(10) Patent No.: US 12,553,398 B2
(45) Date of Patent: Feb. 17, 2026

(54) METHOD TO PERFORM REBREATHE MODE TRANSITIONS

(71) Applicant: SAUDI ARABIAN OIL COMPANY, Dhahran (SA)

(72) Inventors: Christopher E. Whitney, Commerce, MI (US); Ashish Shah, Canton, MI (US); Mark Sellnau, Houston, TX (US); Dustin Sharp, Houston, TX (US); Praveen Kumar, New Hudson, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/758,867

(22) Filed: Jun. 28, 2024

(65) Prior Publication Data
US 2026/0002481 A1    Jan. 1, 2026

(51) Int. Cl.
| | | |
|---|---|---|
| F02D 41/00 | (2006.01) | |
| F02D 13/02 | (2006.01) | |
| F02D 41/38 | (2006.01) | |
| F02D 41/40 | (2006.01) | |

(52) U.S. Cl.
CPC ..... *F02D 41/0055* (2013.01); *F02D 13/0203* (2013.01); *F02D 41/006* (2013.01);
(Continued)

(58) Field of Classification Search
CPC ............... F02D 41/403; F02D 41/0077; F02D 41/3845; F02D 41/006; F02D 13/0203; F02D 41/0055
See application file for complete search history.

(56) References Cited

U.S. PATENT DOCUMENTS

| | | |
|---|---|---|
| 6,668,546 B2 | 12/2003 | Hayman et al. |
| 11,585,284 B1 | 2/2023 | Kurtz et al. |

(Continued)

FOREIGN PATENT DOCUMENTS

| | | |
|---|---|---|
| EP | 1484491 A2 | 12/2004 |
| EP | 1845245 A1 | 10/2007 |

(Continued)

OTHER PUBLICATIONS

Sellnau, Mark et al., "Valvetrain System for Exhaust Rebreathing on a Light-Duty Gasoline Compression Ignition (GCI) Engine"; Proceedings of the Energy & Propulsion Conference & Exhibition; SAE Technical Paper 2023-01-1673; pp. 1-16; Oct. 31, 2023 (16 pages).

(Continued)

*Primary Examiner* — Kevin A Lathers
(74) *Attorney, Agent, or Firm* — Osha Bergman Watanabe & Burton LLP

(57) ABSTRACT

An engine includes pistons, a crankshaft, cylinders, an intake manifold, an exhaust manifold, intake valves, exhaust valves, a fuel rail, and an Electronic Control Unit (ECU). The ECU coordinates operations of the intake valves, the exhaust valves, and the fuel injectors based upon a position of the crankshaft to control the engine to operate in two modes. The two modes include a typical engine operating mode and a rebreathe engine operating mode. The typical engine operating mode includes the ECU controlling the exhaust valves to be actuated after the intake valves are actuated. The rebreathe engine operating mode includes the ECU controlling the exhaust valves to be actuated both during and after the intake valves are actuated. The ECU also controls a Start of Injection (SOI) of the fuel injectors to be retarded during the typical engine operating mode and to be advanced during the rebreathe engine operating mode.

20 Claims, 14 Drawing Sheets

(52) U.S. Cl.
CPC ..... *F02D 41/0077* (2013.01); *F02D 41/3845* (2013.01); *F02D 41/403* (2013.01); *F02D 2200/0406* (2013.01)

(56) References Cited

U.S. PATENT DOCUMENTS

| | | | |
|---|---|---|---|
| 2012/0216775 A1 | 8/2012 | Iwai et al. | |
| 2017/0114748 A1* | 4/2017 | Roth | F02D 41/1454 |
| 2023/0033813 A1* | 2/2023 | Kurtz | F02M 35/104 |

FOREIGN PATENT DOCUMENTS

| | | |
|---|---|---|
| EP | 2698518 A1 | 2/2014 |
| EP | 3 163 058 A1 | 5/2017 |

OTHER PUBLICATIONS

Kumar, Praveen et al., "Development of Two-Step Exhaust Rebreathing for a Low-NOx Light-Duty Gasoline Compression Ignition Engine"; Energies; vol. 15, Issue 18, Article 6565; pp. 1-29; Sep. 2022 (29 pages).

Sellnau, Mark et al., "GDCI Multi-Cylinder Engine for High Fuel Efficiency and Low Emissions"; SAE International Journal of Engines; vol. 8, Issue 2; pp. 775-790; Apr. 2015 (16 pages).

International Search Report issued in corresponding International Application No. PCT/US2025/035185; mailed Oct. 13, 2025 (6 pages).

Written Opinion of the International Searching Authority issued in corresponding International Application No. PCT/US2025/035185; dated Oct. 13, 2025 (7 pages).

* cited by examiner

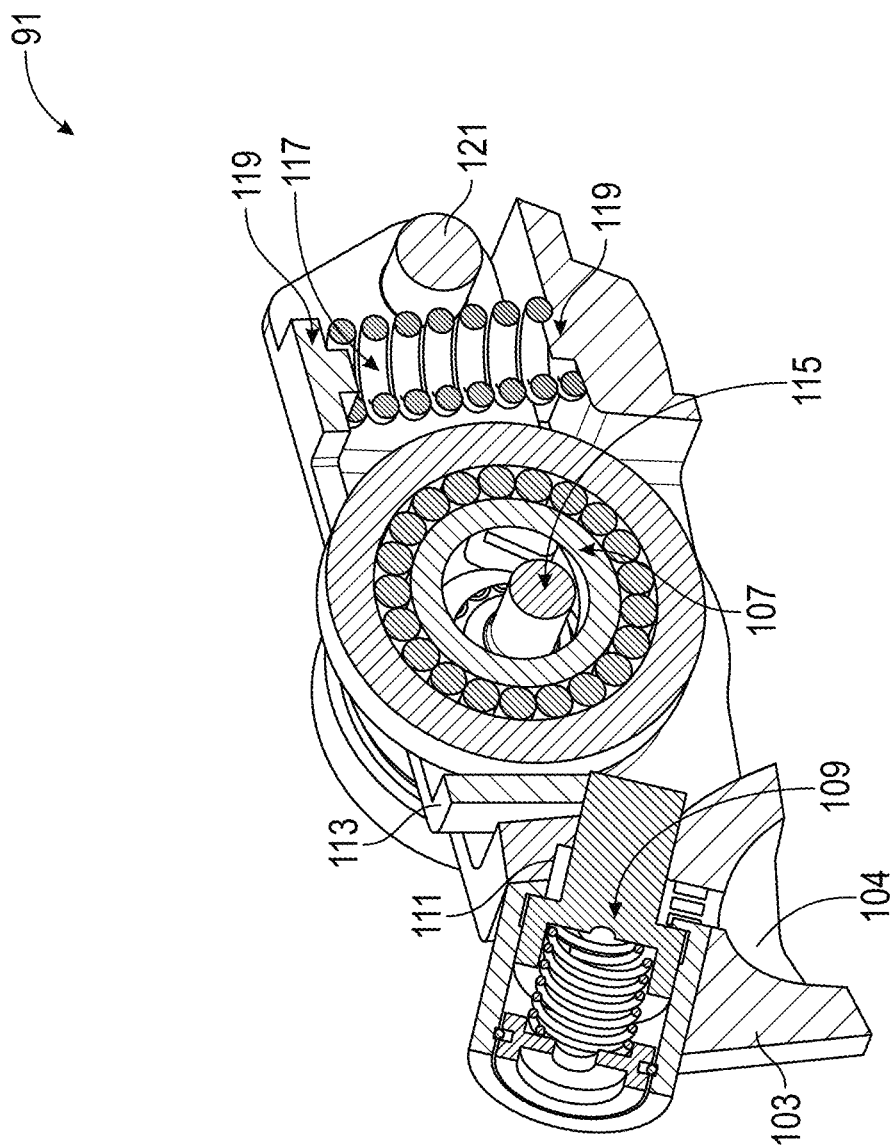
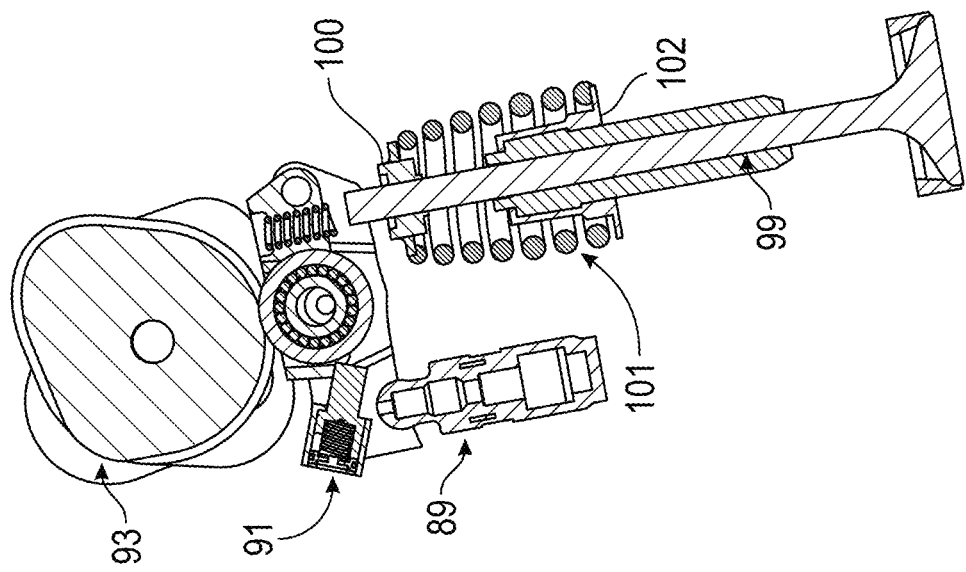
FIG. 5B
FIG. 5A

METHOD TO PERFORM REBREATHE MODE TRANSITIONS

BACKGROUND

In the field of automotive technology, one of the foremost areas of concern includes the removal or reduction of engine emissions. This is because engine emissions include air pollutants produced as a natural byproduct of combustion reactions involving air and fuel mixtures. In extreme cases, exhaust gases may contribute to disastrous natural weather phenomena such as acid rain and smog.

There are multiple avenues to remedy poor exhaust emissions. For example, harmful exhaust gases may be removed in a catalytic conversion process after the combustion reaction occurs. Alternatively, emission formation may be mitigated during the combustion reaction by controlling various engine operating parameters. However, each of these avenues for addressing emissions output comes with additional hardware and software considerations, and the development of an emissions reduction system or subsystem is not trivial. Furthermore, such a system must be implemented in consideration of the impact on the engine and the user, and it is desirable to reduce emissions and increase fuel efficiency without introducing excess noise or engine shudder.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An engine includes pistons, a crankshaft, cylinders, an intake manifold, an exhaust manifold, intake valves, exhaust valves, a fuel rail, and an Electronic Control Unit (ECU). The pistons are actuated by combustion reactions within the engine, and the combustion reactions create exhaust gases. The crankshaft is actuated by the plurality of pistons. The cylinders house the pistons and form a containment boundary for the combustion reactions. The intake manifold supplies a gas mixture to the cylinders. The intake valves form controlled fluid passageways for passing the gas mixture from the intake manifold to the cylinders. The fuel rail connects to fuel injectors that inject fuel into the cylinders, where the injected fuel is combined with the gas mixture to form a fuel mixture that is combusted during the combustion reaction. The exhaust manifold receives the exhaust gases from the cylinders and combines the exhaust gases into an exhaust stream. The exhaust valves form controlled fluid passageways for passing the exhaust gases from the cylinders to the exhaust manifold. The ECU coordinates operations of the intake valves, the exhaust valves, and the fuel injectors based upon a position of the crankshaft in such a manner that the ECU controls the engine to operate in at least two modes including a typical engine operating mode and a rebreathe engine operating mode. The typical engine operating mode includes the ECU controlling the exhaust valves to be actuated after the intake valves are actuated, and the rebreathe engine operating mode includes the ECU controlling the exhaust valves to be actuated both during and after the intake valves are actuated. The ECU also controls a Start of Injection (SOI) of the fuel injectors to be retarded during the typical engine operating mode and advanced during the rebreathe engine operating mode.

A method for operating an engine includes housing pistons in cylinders, where each cylinder forms a containment boundary for a corresponding combustion reaction. A gas mixture is supplied to the plurality of cylinders with an intake manifold, and an amount of the gas mixture to be supplied to each cylinder is controlled with a corresponding intake valve. Fuel is injected into the cylinders with fuel injectors. The injected fuel is combined with the gas mixture to form a fuel mixture. The fuel mixture is combusted during combustion that are contained inside of the engine by the cylinders, and the combustion process creates exhaust gases. The pistons are actuated with the combustion reactions, and in turn actuate a crankshaft connected thereto. Exhaust valves control an amount of the exhaust gases passed from a corresponding cylinder to an exhaust manifold, and the exhaust manifold combines the exhaust gases into an exhaust stream. An ECU coordinates the operations of the intake valves, the exhaust valves, and the fuel injectors based upon a position of the crankshaft in such a manner that the ECU controls the engine to operate in at least two modes. The two modes include a typical engine operating mode and a rebreathe engine operating mode. The typical engine operating mode includes controlling the exhaust valves with the ECU to be actuated after the intake valves are actuated, and the rebreathe engine operating mode includes controlling the exhaust valves with the ECU to be actuated both during and after the intake valves are actuated. A Start of Injection (SOI) of the fuel injectors is controlled by the ECU to be retarded during the typical engine operating mode and is controlled by the ECU to be advanced during the rebreathe engine operating mode.

Any combinations of the various embodiments and implementations disclosed herein can be used in a further embodiment, consistent with the disclosure. Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility.

FIGS. 5A and 5B depict a valvetrain assembly in accordance with one or more embodiments disclosed herein.

DETAILED DESCRIPTION

Specific embodiments of the disclosure will now be described in detail with reference to the accompanying figures. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not intended to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In addition, throughout the application, the terms "upper" and "lower" may be used to describe the position of an element of the invention. In this respect, the term "upper" denotes an element disposed above a corresponding "lower" element in a vertical direction, while the term "lower" conversely describes an element disposed below a corresponding "upper" element in the vertical direction. Similarly, the term "inner" refers to an orientation closer to a center of an object than a corresponding "outer" orientation.

In general, embodiments of this disclosure are directed towards controlling an engine to operate in a rebreathe mode. During the rebreathe mode, referred to as a "rebreathe engine operating mode" herein, exhaust valves are operated during an intake phase of the engine cycle. This allows exhaust gases to flow back into cylinders of the engine, which warms up an intake gas mixture (i.e., air and Exhaust Gas Recirculation (EGR) gases). As a result of the heated intake gas mixture, auto-ignition of a fuel mixture in the cylinder is promoted, NOx emissions are reduced, and the exhaust gas temperature is raised to promote catalysis in the aftertreatment system. In addition to discussing the general parameters at which a rebreathe mode transition occurs, this disclosure further details actions taken by an Electronic Control Unit (ECU) to facilitate transitions to and from the rebreathe engine operating mode.

Figure 1:
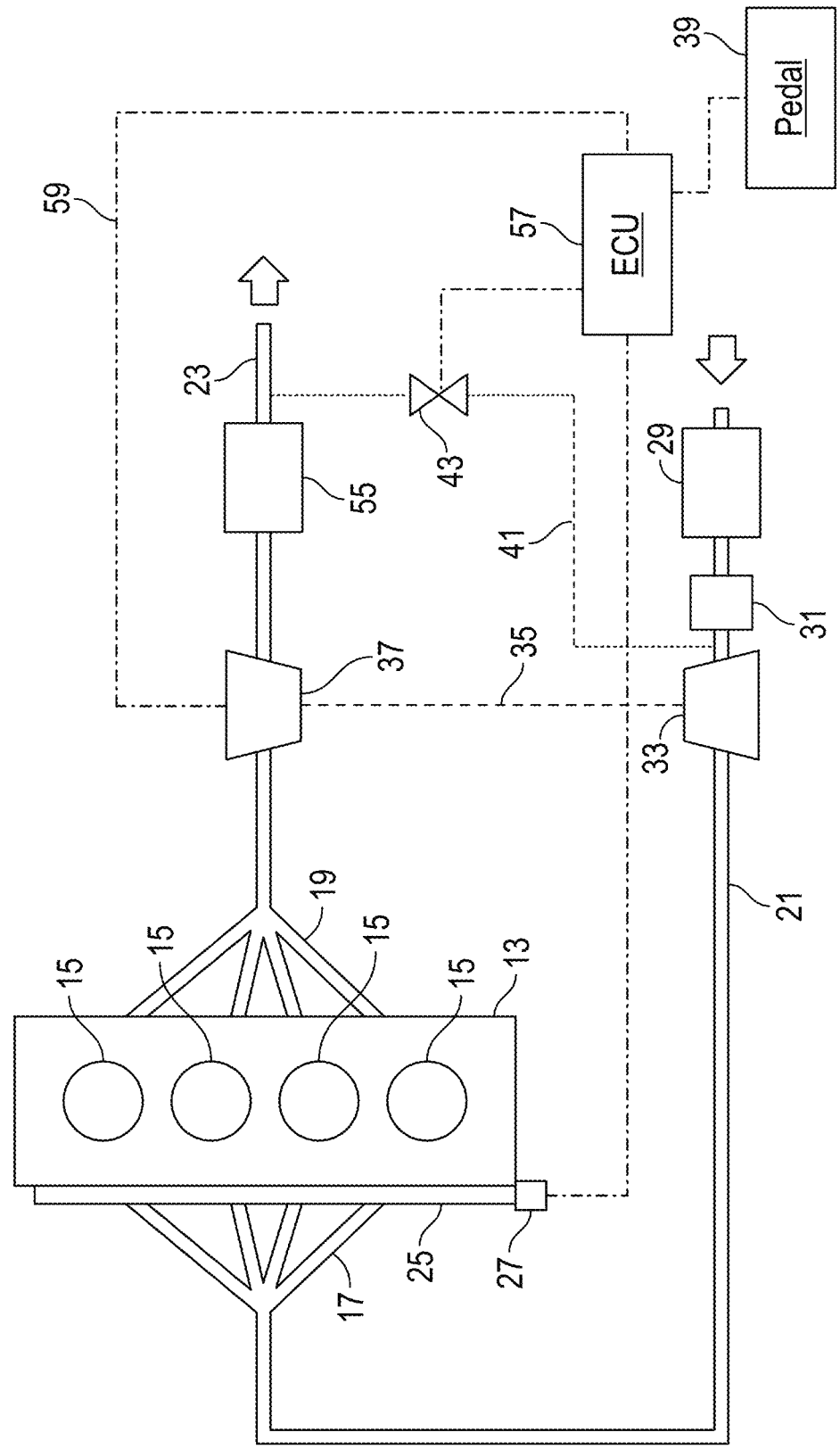
FIG. 1 depicts an engine in accordance with one or more embodiments disclosed herein.

Turning to FIG. 1, FIG. 1 depicts an engine 11 in accordance with one or more embodiments of the invention as described herein. It will be appreciated by a person skilled in the art that FIG. 1 is merely one example of hardware components of an engine, and the design thereof may be modified to suit various real world constraints such as size, cost, component availability, and similar considerations. Thus, FIG. 1 is not intended to limit the particular structure or functionality of an engine. Furthermore, details of the engine 11 that would be appreciated by a skilled person as being routine or superfluous have been omitted where appropriate in order to aid in the brevity of this disclosure.

The central component of the engine 11 is the engine block 13, which provides a casing structure for mounting various other components of the engine 11 thereto. Typically, the engine block 13 is cast from aluminum or iron, and may be cast in upper and lower pieces (not shown). Components such as cylinder head (not shown) that contains a camshaft (e.g., FIG. 2A) are typically attached to the top of the engine block 13, where the cylinder head (not shown) is sealed with gaskets (not shown) and a head cover (not shown) to form a fluidly sealed structure. Similarly, an oil pan (not shown) and a main gallery oil pump (not shown) are typically positioned below the engine block 13, and are also sealed thereto with gaskets (not shown). As a whole and as discussed further below, the engine block 13 and components connected thereto serve to generate a combustion reaction in a contained manner such that the combustion reaction ultimately generates power via a crankshaft (e.g., FIG. 2A).

The aforementioned combustion reaction is contained in cylinders 15, which are bores formed during the process of casting the engine block 13. As shown in FIG. 1, the engine 11 as a whole includes four cylinders positioned in a linear fashion, which is commonly referred to as an "inline-four," "straight-four," or "I-4" engine. As is commonly known in the art, an engine 11 may be configured with any number of cylinders, with non-limiting examples including four, six, eight, or twelve cylinders disposed in various inline or "V" configurations. Each cylinder 15 is sized and shaped to form a containment boundary for a corresponding combustion reaction. The timing and generation of the combustion reaction within each cylinder 15 is further discussed below. As a whole, the combustion reaction of each cylinder 15 is time such that the combustion reactions occur in sequence, which is described further in relation to FIG. 11.

The combustion reaction is generated by compressing fuel mixtures in each of the cylinders 15, the process of which is further depicted in FIGS. 2A-2D. The fuel mixture includes fuel injected into the cylinders 15, air received from an intake manifold 17, and exhaust gases received from an exhaust manifold 19. The fuel portion of the fuel mixture is sprayed into the cylinders 15 by way of a fuel rail 25, which includes a plurality of fuel injectors (e.g., FIG. 2A) and a high-pressure fuel pump 27. The fuel rail 25 is formed as a hollow metal tube that receives fuel from a storage container such as a fuel tank (not shown). Fuel is pressurized by way of the high-pressure fuel pump 27, which may be embodied as a centrifugal or a positive displacement pump. The high-pressure fuel pump 27 features a variable geometry inlet valve (not shown) that is controlled by an Engine Control Unit (ECU) 57 as discussed below to regulate pressure in the fuel rail 25. Specifically, a pressure sensor (not shown) located on the fuel rail 25 senses rail pressure for feedback control by the ECU 57.

On the other hand, the air portion of the fuel mixture is received from the air intake line 21. The air intake line 21 is open at one end to receive air from an external environment of the engine 11, and is typically formed of a flexible plastic hose. The open end of the air intake line 21 includes an air filter 29 that serves to remove large particulate matter from the intake air stream. The air filter 29 may be disposed in a separate housing that is connected in-line with the air intake line 21 with hose clamps, for example.

Downstream of the air filter 29 and also in line with the air intake line 21, a Mass Air Flow (MAF) sensor 31 is positioned to capture the amount of air flowing into the engine 11 as a whole. The MAF sensor 31 is further discussed below in relation to FIG. 7. The air is compressed by a compressor 33, which is formed as a wheel with blades that serve to accelerate the volume of air flowing therethrough. The compressor 33 is connected by way of a shaft 35 to a turbine 37, which is a blade-ridden wheel that is actuated by exhaust gases of the combustion reaction. In this way, the exhaust gases generated by the engine 11 serve to compress a flow of air used to generate a subsequent combustion reaction in a cyclic process.

Collectively, the compressor 33 and the turbine 37 form a Variable Geometry Turbocharger (VGT). As will be appreciated by a person skilled in the art, a Variable Geometry Turbocharger may include a sliding nozzle or pivoting vane turbine, as well as a compressor that includes variable inlet guide vanes and/or variable geometry diffusers. Thus, the turbine 37 may be embodied as a sliding nozzle turbine or a pivoting vane turbine, or functional equivalents thereof. On the other hand, the compressor 33 may be embodied including variable inlet guide vanes and/or variable geometry diffusers, or functional equivalents thereof. By controlling the amount that the nozzle (not shown) slides or the aperture of the pivoting vanes (not shown), the rotation of the turbine 37 is controlled. Because the turbine 37 is rotationally connected to the compressor 33 by the shaft 35, the amount of air drawn into the engine 11 by the compressor 33 is a function of the rotation speed of the turbine 37. Thus, controlling the internal geometry of the turbine 37 also controls the volume of air present in future combustion reactions.

After passing through the compressor 33, the compressed air stream is passed to an intake manifold 17 and the cylinders 15. The intake manifold 17 partitions the regulated compressed air stream from the air intake line 21 into distinct streams. The intake manifold 17 is formed as a plenum with one inlet and multiple outlets, where each outlet corresponds to one of the cylinders 15. Thus, the intake manifold 17 serves to form multiple fluid passageways that connect the cylinders 15 to the air intake line 21 for purposes of receiving the regulated compressed intake air stream in the cylinders 15.

Similar to the intake manifold 17, the engine 11 includes an exhaust manifold 19 that receives exhaust gases from the cylinders 15. The exhaust manifold 19 is formed as a plenum with multiple inlets and a single outlet, such that the exhaust manifold 19 serves to combine the exhaust gas streams from each cylinder 15 into a single, unified exhaust gas stream.

The exhaust manifold 19 connects to a turbine 37, which is connected by a shaft 35 to the compressor 33. Thus, exhaust gases are utilized to actuate the turbine 37, which drives the compressor 33 as discussed above. Downstream of the turbine 37, the exhaust pipe 23 includes an aftertreatment device 55.

The after-treatment device 55 includes multiple lean burn after-treatment components used in combination with one or more chemical catalysts to reduce tailpipe emissions. In this regard, the aftertreatment system may include, for example, Gasoline Oxidation Catalysts (GOC), particulate filter(s), urea dosing units, selective catalytic removal (SCR) catalysts, and similar emission control devices. Because low exhaust temperatures inhibit catalytic conversion, it is desirable to maintain a high exhaust temperature on the order of 300-350 degrees Celsius (° C.). Such temperatures are enabled by the rebreathe engine operating mode as further discussed below.

After the exhaust gas is treated by the aftertreatment system, a portion of the exhaust gas stream is fed back to the compressor 33 inlet by an Exhaust Gas Recirculation (EGR) line 41. The EGR line 41 is separated into two portions. A first portion of the EGR line 41 serves to connect the exhaust pipe 23 to an EGR valve 43, while a second portion of the EGR line 41 serves to connect the EGR valve 43 to the compressor 33 inlet. The EGR valve 43 is embodied as a motor driven poppet valve, and regulates the amount of exhaust gases that are passed from the exhaust pipe 23 to the compressor 33 inlet. Within the intake pipe 21, the exhaust gases from the EGR line 41 are mixed with the compressed air stream to form a gas mixture, which is combined with the fuel in the cylinder 15 to form the fuel-air-exhaust mixture. After exiting the after-treatment device 55, the exhaust gas is exhausted to the external environment by the exhaust pipe 23 as discussed above, which completes the combustion process.

The various functions of components of the engine 11 are coordinated by an Electronic Control Unit (ECU) 57. The ECU 57 is formed as one or more processors, integrated circuits, controllers, or a combination thereof that serve to execute computer readable instructions. The ECU 57 may include a memory (e.g., FIG. 7) and a processor (e.g., FIG. 7) that respectively serve to store and execute the computer readable instructions. The computer readable instructions include information regarding the conditions (i.e., timing, engine temperature, pressure, duration, etc.) for actuating a particular component of the engine 11. Such instructions are formed based upon a fuel map as depicted in FIG. 8 and further discussed below. As shown in FIG. 1, the ECU 57 is connected to components of the engine 11 such as the high-pressure fuel pump 27, the EGR valve 43, the turbine 37, and various other components by way of a wiring harness 59. For its part, the wiring harness 59 is formed as a plurality of wires that form electrical pathways for transmitting signals from the ECU 57 to the various components. The ECU 57 receives user input by way of an accelerator pedal 39, which may be embodied, for example, as a lever fixed to a potentiometer. The user input correlates to a request for additional torque, and the pedal 39 is also connected to the ECU 57 by way of the wiring harness 59.

Turning to FIGS. 2A-2D, FIGS. 2A-2D illustrate the four-step process followed by the engine 11 for creating a combustion reaction. Specifically, FIG. 2A relates to the intake phase of the combustion reaction, whereas FIG. 2B relates to the compression phase, FIG. 2C relates to the power phase, and FIG. 2D corresponds to the exhaust phase of the engine cycle. FIGS. 2A-2D each depict a point in time during the operation of a single cylinder 15, such that FIGS. 2A-2D will be replicated for each cylinder 15 per engine cycle.

Figure 2:
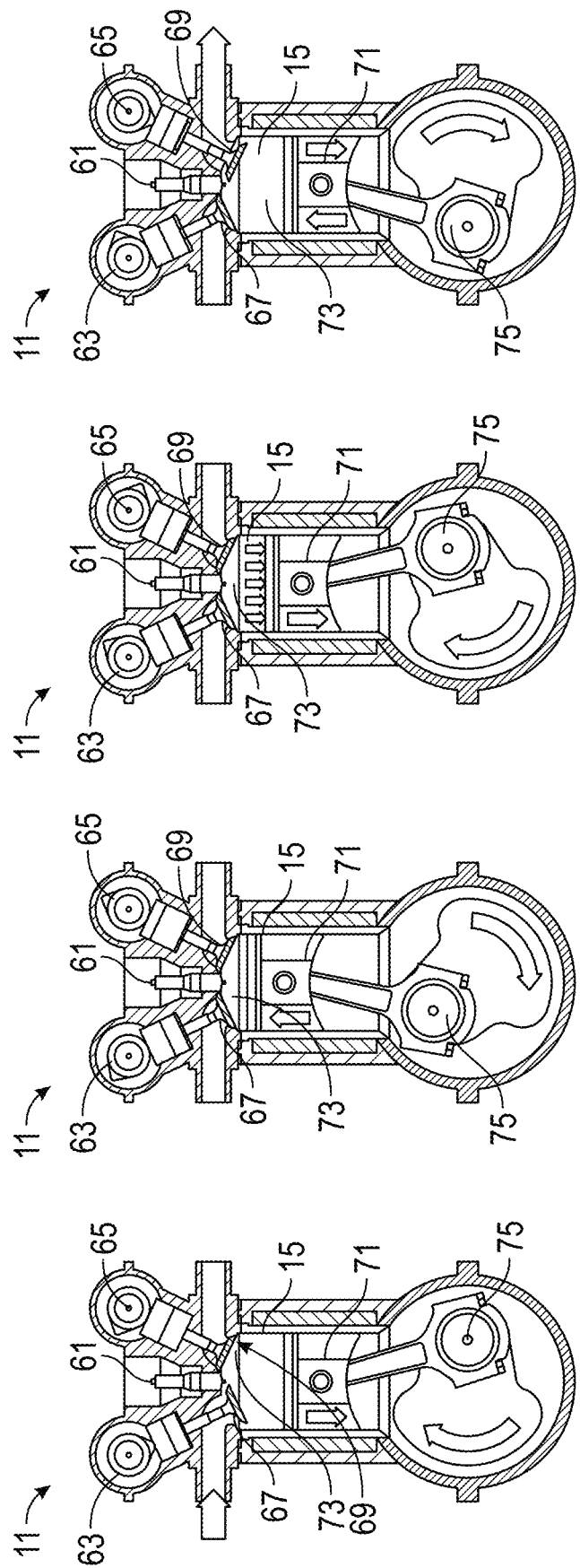
FIGS. 2A-2D depict phases of an engine cycle in accordance with one or more embodiments disclosed herein.

As illustrated in FIG. 2A, the engine 11 includes a fuel injector 61, which is fluidly connected to the fuel rail 25. The fuel injector 61 is embodied, for example, as an electromagnetically actuated pintle valve that serves to selectively pass fuel from a storage container, such as a fuel tank (not shown), into a corresponding cylinder 15. The actuation of the fuel injector 61 is controlled by the ECU 57 as discussed further below. In addition, the ECU 57 coordinates the operation of each fuel injector 61 in tandem with the other fuel injectors 61 to form a cohesive operation that includes multiple combustion reactions occurring in quick succession.

The engine 11 further includes an intake camshaft 63 and an exhaust camshaft 65. In general, the camshafts 63 and 65 are formed as metal rods that serve to mechanically control the operation of the engine 11 by regulating the introduction and removal of various fluids from the cylinders 15. The camshafts 63 and 65 are aligned so as to extend across each of the cylinders 15, such that a single intake camshaft 63 coordinates the intake operations and a single exhaust camshaft 65 coordinates the exhaust operations of the cylinders 15. Each camshaft includes a plurality of lobes (e.g., FIG. 6B) that actuate a corresponding valve of a corresponding cylinder 15. The corresponding valves include, for example, an intake valve 67 that actuates based on the motion of the intake camshaft 63 and an exhaust valve 69 that actuates based on the motion of the exhaust camshaft 65. In the context of FIGS. 2A-2D, the intake valve 67 serves to introduce a gas mixture into the cylinder 15, where the gas mixture is an intake gas mixture that includes a compressed air stream from the air intake line 21 and EGR from the EGR line 41. Similarly, the exhaust valve 69 serves to selectively pass exhaust gases formed by a completed combustion reaction from the cylinders 15 to the exhaust manifold 19. The intake valve 67 and the exhaust valve 69 may be formed, for example, from metal and are typically formed with a conical profile that is attached to a tappet. Such a valve is typically referred to as a "poppet" valve in the art.

For its part, the cylinder 15 forms a containment boundary for the combustion reaction in conjunction with a piston 71 that is actuated by the combustion reaction. The usable volume within the containment boundary is depicted as a combustion chamber 73, which represents the volume in the engine 11 created by the piston 71 and the cylinder 15. The piston 71 is a solid body, typically formed of metal, that is thrust downwards by the combustion reaction. The piston 71 is mechanically coupled to a crankshaft 75, which performs multiple functions discussed below. As a first function, the crankshaft 75 serves to couple the combined actuation of the pistons 71 into a single motion, such that the crankshaft 75 forms a power output shaft of the engine 11. As a second function, the crankshaft 75 provides a point to measure output rotations of the engine 11, such that the position of the crankshaft 75 is related to the timing of operations of the engine 11 as a whole.

With the components of FIGS. 2A-2D discussed above, the below paragraphs related to FIGS. 2A-2D discuss time-dependent actions taken by various components of the engine 11 to create the combustion reaction. In relation to FIG. 2A specifically, the intake valve 67 is opened by the intake camshaft 63 to allow the gas mixture to pass from the intake manifold 17 to the cylinder 15. This is further facilitated by the crankshaft 75 being actuated by other combustion reactions in other cylinders 15, causing the piston 71 of FIG. 2A to thrust downward and creating a negative pressure in the combustion chamber 73. Accordingly, FIG. 2A corresponds to the intake phase of a four stroke combustion process, as FIG. 2A depicts the gas mixture entering the cylinder 15. Once the gas mixture is disposed in the combustion chamber 73, the process continues as depicted in FIG. 2B.

In FIG. 2B, the piston 71 is forced upwards by the crankshaft 75 to compress the gas mixture inside of the combustion chamber 73, which is referred to as the "compression" phase of the four stroke combustion process. Similar to the actuation of the piston 71 in FIG. 2A, the crankshaft 75 actuates the piston 71 in FIG. 2B using power siphoned from other power strokes of other cylinders 15. The process of actuating the piston 71 in FIG. 2B is completed when the piston 71 reaches the height of its motion, which is referred to as Top Dead Center (TDC) due to the cylinder 15 being at the top of its travel path. At this point, the process transitions to FIG. 2C, which represents the power phase of the four stroke combustion process.

As shown in FIG. 2C, the power phase initiates by spraying a small burst of fuel into the combustion chamber 73 by way of the fuel injector 61. Due to the relatively rapid compression of the gas mixture during the compression phase depicted in FIG. 2B, the combustion chamber 73 has an internal temperature above the combustion temperature of the injected fuel. Thus, the injected fuel auto-ignites upon coming into contact with the heated gas mixture, and the subsequent rapid expansion causes the piston 71 to actuate downward and transfer its motion to the crankshaft 75. The power phase depicted in FIG. 2C is complete when the piston 71 has substantially reached its lowermost point of motion, which is referred to as Bottom Dead Center (BDC) herein.

Once the power phase of FIG. 2C is complete the process continues to FIG. 2D, which depicts the exhaust phase of the four stroke combustion process. During the exhaust phase, the exhaust camshaft 65 actuates an exhaust valve 69, which creates a fluid passageway between the cylinder 15 and the exhaust manifold 19. The piston 71 is actuated by the crankshaft 75 during this time to actively force exhaust gases from the cylinders 15 by reducing the volume of the combustion chamber 73. Once the exhaust gases have been removed from the cylinder 15, the four stroke combustion process is complete, and restarts with the intake phase depicted in FIG. 2A.

The above process provides a brief overview of a four stroke combustion reaction process. However, and as discussed further below, the engine 11 is configured by the ECU 57 to operate according to two separate modes: a typical engine operating mode and a rebreathe engine operating mode. The term "typical" as recited herein relates to the above discussed four stroke process. On the other hand, the term "rebreathe" as recited herein relates to a separate process that involves additionally operating the exhaust valve 69 during the intake phase. That is, during a rebreathe operating mode the exhaust valve 69 is opened by the exhaust camshaft 65 to allow exhaust gases from a previous combustion reaction to re-enter the cylinder 15. The re-entered exhaust gases are combined with the intake gas mixture (i.e., intake air and EGR) in the combustion chamber 73, and are combusted therewith during a subsequent combustion reactions. As a result, exhaust gases created in the cylinder 15 during the exhaust phase of a first four stroke process are re-inducted to the cylinder 15 during the intake phase of a second four stroke process.

Figure 3:
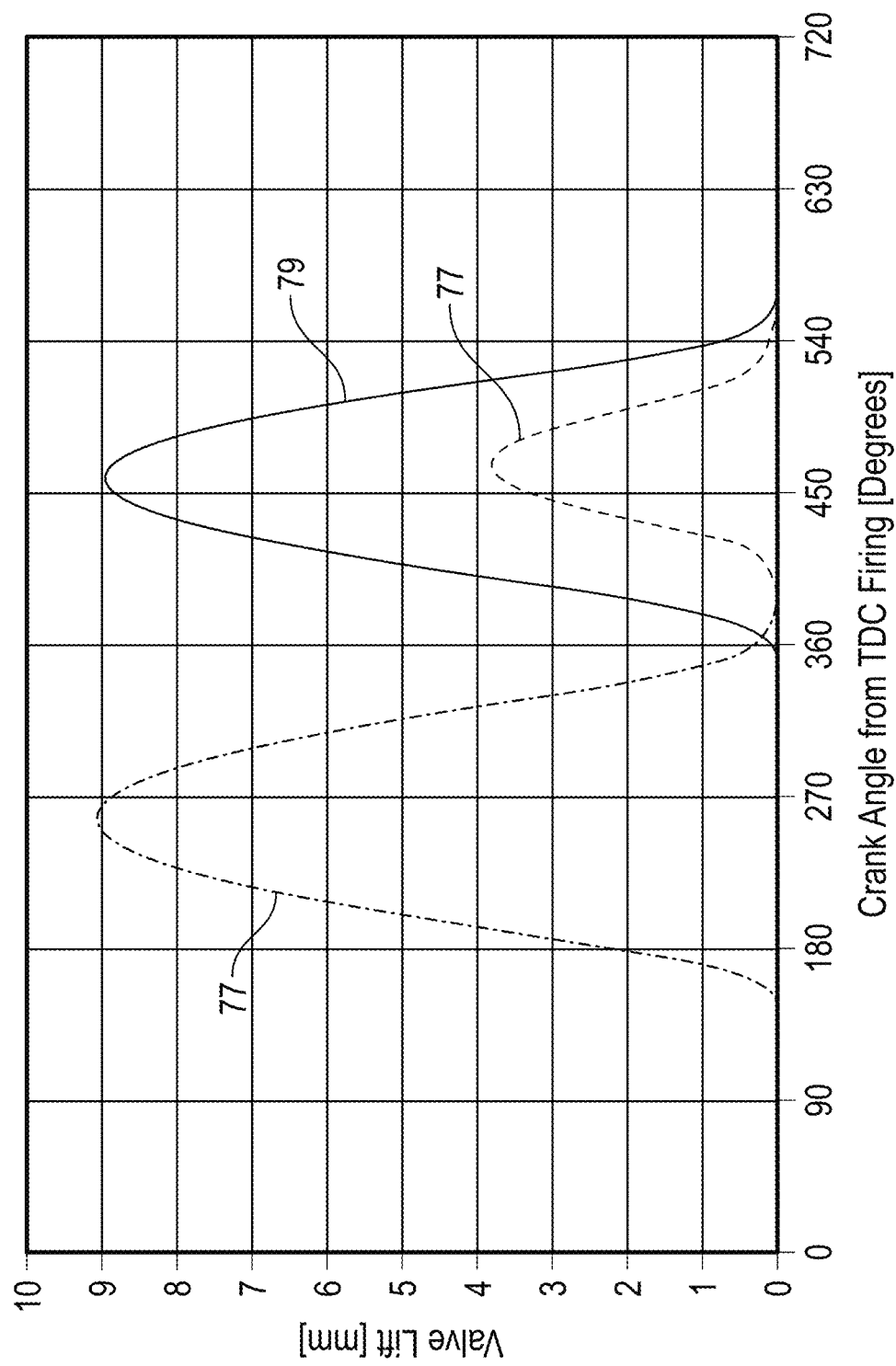
FIG. 3 depicts a graph of a crankshaft position versus valve lift in accordance with one or more embodiments disclosed herein.

A visual depiction of the rebreathe process is depicted in FIG. 3. In particular, FIG. 3 depicts a graph of valve actuations related to an angle of the crankshaft 75. The valve actuations are expressed in terms of "valve lift," or the linear displacement of a particular valve relative to its starting position. The angle of the crankshaft 75 is expressed in terms of degrees, where a measurement of 0 degrees corresponds to a starting position of the crankshaft 75 at the start of the intake phase.

As shown in FIG. 3, an exhaust valve 69 is actuated from approximately 150 degrees to 380 degrees during the first combustion process, which is represented by the exhaust valve actuation profile 77 of FIG. 3. During this time, the exhaust valve 69 reaches a peak displacement of roughly 9 millimeters (mm), which is demonstrated by the apex of the exhaust valve actuation profile 77 being located thereat. The second combustion cycle is initiated by opening the intake valve 67 and occurs from approximately 350 degrees to 560 degrees relative to the crankshaft 75. The intake valve 67 is also actuated to a peak displacement of 9 mm during the intake phase, which is demonstrated by the intake valve actuation profile 79 depicted in FIG. 3.

During the second combustion cycle with exhaust rebreathing, and as shown in FIG. 3, the exhaust valve 69 is again opened, allowing exhaust gases to re-enter the cylinder 15 and creating the "rebreathe" engine operating mode. However, and as shown in FIG. 3, the exhaust valve 69 only experiences a displacement of roughly 3.8 mm, in juxtaposition to the previously discussed 9 mm displacement. Such is shown by the exhaust valve actuation profile 77 having a peak located at 3.8 mm in FIG. 3 at approximately the same time as the intake valve actuation profile 79 indicates that the intake valve 67 has a displacement of 9 mm. Thus, during the rebreathe engine operating mode, the exhaust valve 69 is only displaced a fraction of the total displacement of the intake valve 67. In turn, this facilitates the ratio of exhaust gases and intake gas mixture in the cylinder 15, such that a larger displacement of the exhaust valve 69 during this time will increase the portion of the intake gas mixture formed by exhaust gases. Similarly, the amount of exhaust gases present in the intake mixture may be decreased by reducing the displacement of the exhaust valve 69 during the intake phase, such that the parameters of the rebreathe process are a function, in part, of the displacement of the valves 67 and 69.

As shown in FIG. 3, both the intake and exhaust valves are open for various durations during the intake phase of the engine 11 for the exhaust rebreathing operation. During the intake phase, the piston 71 descends from top dead center to bottom dead center and draws gases from both the intake manifold and the exhaust manifold for a mixture of fresh air, EGR, and hot exhaust gases. While valve lift profiles shown in FIG. 3 are fixed, the amount of hot exhaust gases rebreathed into the combustion chamber 73 may be controlled by the amount of exhaust back pressure created by the turbocharger. Typical turbochargers (i.e., a turbocharger collectively formed by the compressor 33, shaft 35, and turbine 37) used by diesel engines feature adjustable vanes or variable nozzles (e.g., FIG. 7) that direct the exhaust flow at various angles to the wheel of the turbine 37 for optimal efficiency over the operating map. During exhaust rebreathing, the vane positions may be controlled to modulate the amount of exhaust rebreathing for best efficiency, emissions, stability, and exhaust temperature. The turbine vane position is controlled by an electromechanical actuator under directions received from the ECU 57. Actuator settings are typically determined as part of the calibration mapping procedure of the engine.

Figure 4:
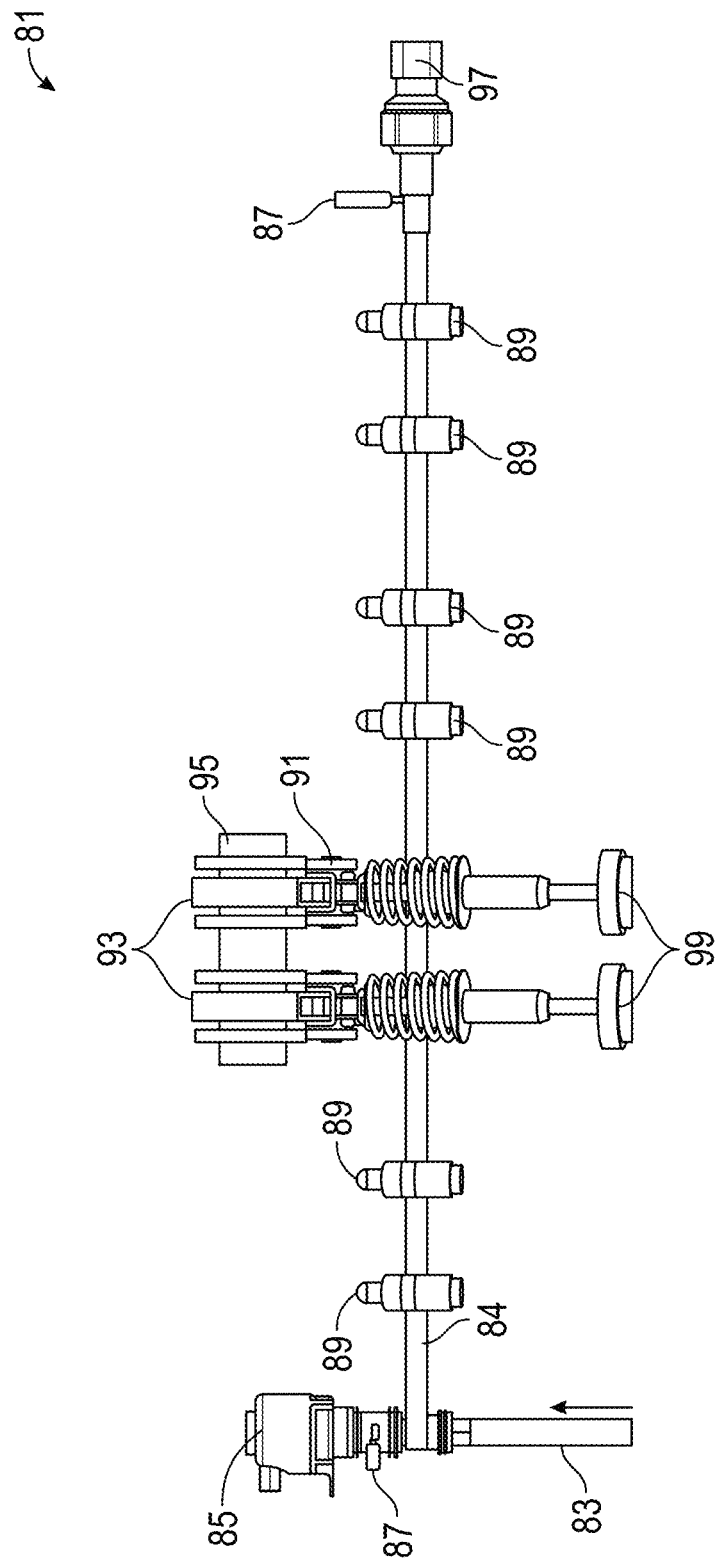
FIG. 4 depicts a valvetrain system in accordance with one or more embodiments disclosed herein.

Turning to FIGS. 4-6B, these Figures are directed towards various hardware components that facilitate transitioning the engine 11 from a typical engine operating mode to a rebreathe engine operating mode. In particular, FIG. 4 presents an overview of an valvetrain actuation system 81 utilized to facilitate the engine 11 operating mode transition. On the other hand, FIGS. 5A-6B depict detailed examples and alternate views of components depicted in the valvetrain actuation system 81 of FIG. 4.

As shown in FIG. 4, the valvetrain actuation system 81 includes a first oil line 83, which carries oil from a Main Oil Gallery (MOG) of the engine 11. The engine 11 includes a lubrication system which may include, for example, an oil pan (not shown), an oil pump (not shown), an oil circuit (not shown), and the MOG, which distributes oil to the main bearings of engine 11. Thus, the first oil line 83 serves to divert a portion of oil from the MOG to the valvetrain actuation system 81. The first oil line 83 is fluidly connected to a second oil line 84 that feeds oil to a plurality of lash adjusters 89, discussed further below. The pressure of the oil disposed in the second oil line 84 is controlled by way of an oil control valve 85, which is a solenoid driven valve that regulates the flow of oil into the second oil line 84, and thus the valvetrain actuation system 81 as a whole.

Measurements of the oil pressure within the second oil line 84 are captured by the lash oil pressure sensor 97 depicted in FIG. 4, which is disposed at an opposite end of the outlets 84 from the oil control valve 85. Thus, the lash oil pressure sensor 97 may be formed, for example, as a diaphragm attached to a variable resistance resistor, such that the diaphragm is actuated to create a measurable resistance that corresponds to the oil pressure within the second oil line 84. The oil control valve 85 and the lash oil pressure sensor 97 each include a vent 87 that allows air trapped in the second oil line 84 to be vented to the external environment of the engine 11.

The oil disposed in the second oil line 84 is dispersed to a plurality of lash adjusters 89. The lash adjusters 89 are disposed in pairs, such that each cylinder 15 corresponds to a pair of lash adjusters 89. Functionally, the lash adjusters 89 are embodied as fluid outlets that serve to deliver oil from the second oil line 84 to a corresponding tri-roller Roller Finger Follower (RFF) 91 in order to facilitate a transition between engine operating modes. The lash adjusters 89 also provide a pivot point for the RFF 91 to rotate about when actuated by the camshaft. The tri-roller RFF 91 is actuated by a corresponding cam 93, and the structure of the tri-roller RFF 91 is further discussed below in relation to FIG. 5A. Each cam 93 includes an inner lobe (e.g., FIG. 6B) and two outer lobes (e.g., FIG. 6B). The outer cam lobes are always in contact with the tri-roller RFF 91, and actuate the exhaust valves 69 for the main exhaust event. The inner cam lobe actuates the exhaust valves 69 a second time during the intake stroke when in rebreathe mode. The cams 93 are fixed to a camshaft 95, such that the actuation of the corresponding cam 93 is transferred to the camshaft 95. The camshaft 95 depicted in FIG. 4 corresponds to the exhaust camshaft 65 discussed previously, and is denoted separately for the sake of simplicity.

In addition, the tri-roller RFF 91 also actuates valves 99 of the engine 11. In this regard, the tri-roller RFF 91 is positioned to simultaneously abut against a corresponding cam 93 and a corresponding valve 99. Similar to the camshaft 95, the valves 99 depicted in FIG. 4 correspond to the intake valve 67 and the exhaust valve 69, and are denoted separately for the sake of simplicity. Thus, as further discussed below, in addition to controlling which lobe (e.g., FIG. 6B) of a corresponding cam 93 is currently facilitating the engine 11 operation, the tri-roller RFF 91 serves to mechanically couple the motion of the selected lobe to the corresponding valve 99.

Turning to FIG. 5A, FIG. 5A depicts a side view of some of the components forming the valvetrain actuation system 81 discussed in FIG. 4. Specifically, FIG. 5A depicts a cam 93, a tri-roller RFF 91, a lash adjuster 89, a valve 99, a valve spring 101, a spring cap 100, and a spring seat 102. As discussed above, the lash adjuster 89 is a tube or conduit that forms a fluid outlet from the second oil line 84 to a particular tri-roller RFF 91. Depending on the oil pressure delivered by the lash adjuster 89, the tri-roller RFF 91 occupies one of two positions. In a first position, the lock pin 109 is engaged and the tri-roller RFF 91 contacts an inner lobe (e.g., FIG.

6B) of the cam 93, while also contacting the outer lobes (e.g., FIG. 6B) thereof. In the second position, the lock pin 109 is retracted and the tri-roller RFF 91 contacts the outer lobes (e.g., FIG. 6B) of the cam 93, which causes actuation of the valve 99 for the main exhaust event. The inner cam lobe (e.g., FIG. 6B) contacts a central bearing (e.g., FIG. 6B), which deflects against the spring 117 and does not cause rebreathe valve motion. This is called "lost motion," as the motion of the inner cam lobe (e.g., FIG. 6B) does not cause response from the engine 11.

Figure 6B:
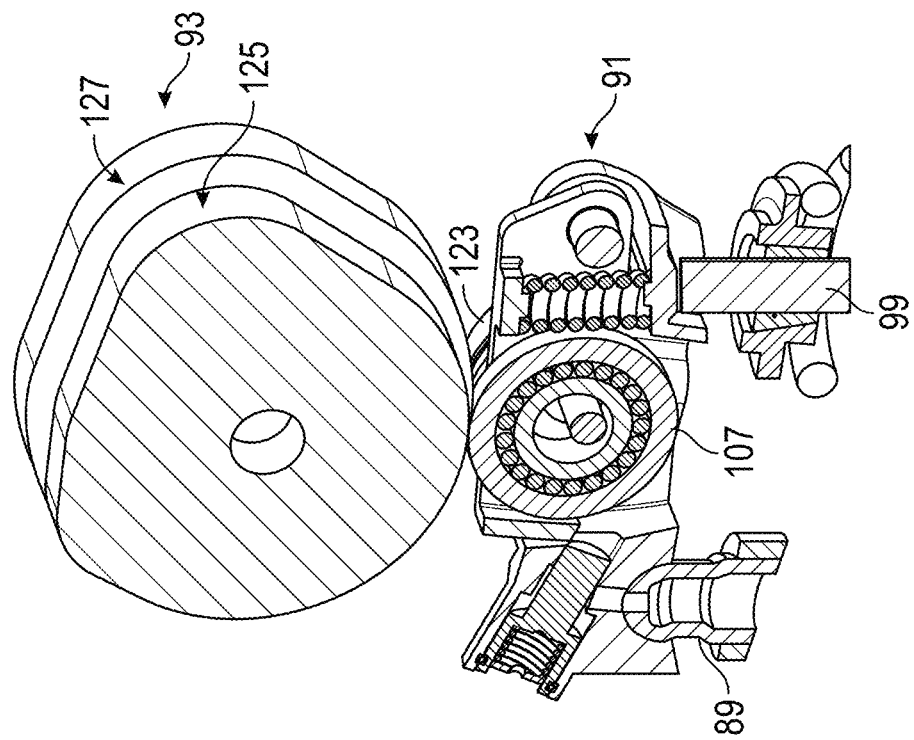
FIGS. 6A and 6B depict a two-step Roller Finger Follower (RFF) in accordance with one or more embodiments disclosed herein.

As noted above, the cam 93 actuates a corresponding valve 99 according to its cam profile, such that the linear displacement of the corresponding valve 99 is controlled by the position of the cam lobes (e.g., FIG. 6B). Thus, by using the tri-roller RFF 91 to switch between cam lobes, the engine 11 as a whole is capable of operating in the multiple distinct modes discussed herein. Furthermore, because the actuation of the tri-roller RFF 91 is tied to the fluid delivery provided by the lash adjuster 89, the motion of the tri-roller RFF 91 is controlled by regulating the oil pressure within the lash adjuster 89. Moreover, because the valve 99 displacement is a function of the selected cam lobe, the displacement of the corresponding valve 99 is also a function of the oil pressure within the lash adjuster 89, or more generally as a function of the oil pressure of the second oil line 84. A valve spring 101 abuts against a spring cap 100 attached to the tri-roller RFF 91 and a spring seat 102 attached to the valve 99. The valve spring 101 provides a force on the valve 99 to ensure contact between the valve 99 tip, the tri-roller RFF 91, and cam 93 surfaces while operating the engine 11.

FIG. 5B depicts a tri-roller RFF 91 in accordance with one or more embodiments of the invention described herein. As shown in FIG. 5B, the tri-roller RFF 91 includes a body 103 and an arm 113, which are solid in nature and may be formed of iron or steel, for example. The body 103 and the arm 113 are mechanically coupled by way of a shaft 121 such that the body 103 may rotate relative to the arm 113 and vice versa.

As noted above, the lash adjuster 89 is embodied as a tube or conduit, and extends into the underside of the body 103 to deliver oil into a socket 104 of the body 103. The body 103 includes a cavity 111 that contains a lock pin 109 that is actuated by oil received from the socket 104 (which receives oil from the lash adjuster 89) to withdraw from a first position to a second position. In the first position, the lock pin 109 abuts against an arm 113. The arm 113 is fixed to or integrally formed with the inner bearing trace of the bearing 107, and is further connected by a shaft 121 to the body 103. Thus, the lock pin 109 prevents the arm 113 from rotating in a counterclockwise motion when the lock pin 109 is in the first position. In the second position, the lock pin 109 is at least partially withdrawn into the cavity 111 such that the lock pin 109 does not contact the arm 113, and the arm 113 may rotate in a counterclockwise direction relative to the body 103.

Each of the arm 113 and the body 103 include a spring guide 119, which is an integrally formed beveled protrusion that serves to retain a spring 117. In particular, the spring 117 depicted in FIG. 5B is compressed between a spring guide 119 of the body 103 and a spring guide 119 of the arm 113. The spring 117 applies a compressive force to the body 103 and the arm 113 that causes the bearing 107 to continuously abut against the inner lobe (e.g., FIG. 6B) regardless of which operating mode is selected for the engine 11.

The first and second positions of the lock pin 109 further correspond to the typical engine operating mode and the rebreathe engine operating mode discussed above. While the lock pin 109 is in the first position (i.e., abutted against the arm 113), the arm 113 forces the bearing 107 to remain in an upper position. While the bearing 107 is in this first position, the bearing 107 contacts an inner lobe (e.g., FIG. 6B) of the cam 93 such that the body 103 actuates the valve 99 according to the profile of the inner lobe.

On the other hand, while the lock pin 109 is in the second position (i.e., at least partially withdrawn into the cavity 111), the inner lobe (e.g., FIG. 6B) of the cam 93 causes rotational movement of the arm 113 forces the bearing 107 (and roller elements connected thereto) downward into a lower position. As a result of the bearing 107 being in the lower position, the inner lobe (e.g., FIG. 6B) of the cam 93 does not actuate the valve 99. Rather, outer lobes (e.g., FIG. 6B) of the cam 93 contact outer rollers (e.g., FIG. 6A) of the body 103, and this causes the body 103 to actuate according to the profile of the outer lobes (e.g., FIG. 6B) of the cam 93. Thus, depending upon the position of the lock pin 109 as a function of the oil pressure in the socket 104, the engine 11 is operated in either the typical engine operating mode or the rebreathe engine operating mode.

Figure 6A:
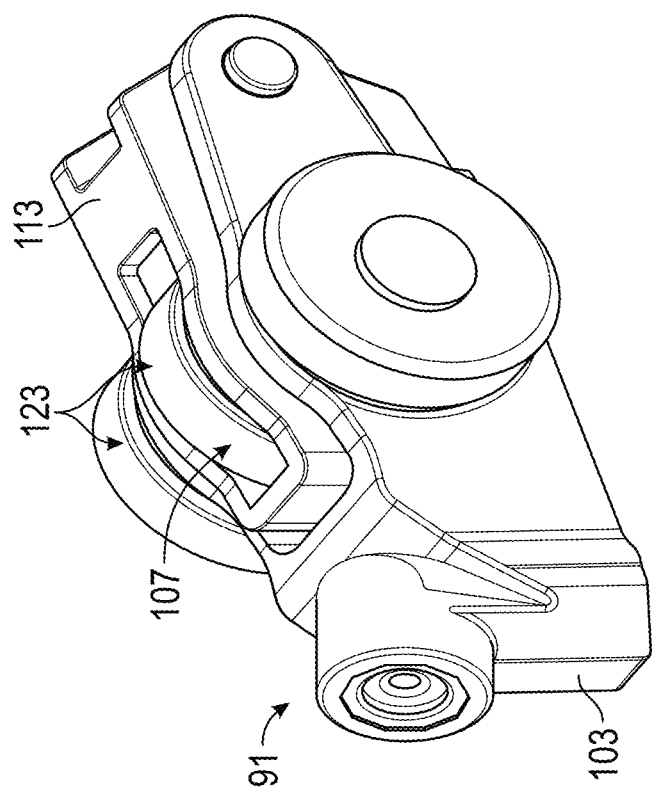

Turning to FIG. 6A, FIG. 6A depicts an isometric view of the exterior of the tri-roller RFF 91. As shown in FIG. 6A, outer rollers 123 are fixed to the exterior of the body 103 and are connected by a shaft 115. The outer rollers 123 may be formed, for example, as encased bearings with a central shaft or bearing trace that is integrally formed with or otherwise rigidly fixed to the body 103. Overall, the tri-roller RFF 91 functions to transfer the motion of the outer lobes (e.g., FIG. 6B) of the cam 93 to a corresponding valve 99. Regardless of which operating mode is selected, the tri-roller RFF 91 actuates the valve 99 during the main exhaust event. During the rebreathe engine operating mode, the tri-roller RFF 91 actuates the valve 99 an additional time during the intake stroke to facilitate exhaust rebreathing.

FIG. 6B depicts an isometric cutaway view of various components discussed previously in relation to FIGS. 5A and 5B, with a particular emphasis on the structure of the cam 93. As discussed previously, a tri-roller RFF 91 is actuated by oil supplied from a lash adjuster 89 to abut against the cam 93, and the tri-roller RFF 91 further actuates a valve 99 according to the active lobe of the cam 93. In this case, the term "active" refers to a lobe of the cam 93 that is currently abutted against the tri-roller RFF 91, whereas the other lobe(s) are considered to be "inactive" insofar as the other lobe(s) are freely rotating without actuating the tri-roller RFF 91.

The cam 93 is formed with two separate cam profiles that respectively correspond to the shape of an inner lobe 125 and an outer lobe 127. As shown in FIG. 6B, the inner lobe 125 is positioned immediately above a bearing 107 forming the center roller of the tri-roller RFF 91, whereas the outer lobes 127 are positioned immediately above outer rollers 123 of the tri-roller RFF 91. As a consequence of this arrangement, the inner lobe 125, which contacts the bearing 107, also corresponds to the rebreathe engine operating mode such that the tri-roller RFF 91 is actuated according to the profile of the inner lobe 125 during the rebreathe engine operating mode. The outer lobe 127 is shaped with a profile corresponding to the main exhaust event, and the tri-roller RFF 91 follows the outer lobe 127 throughout either the typical engine operating mode or the rebreathe engine operating mode. That is, only the outer lobe is actuated during the typical engine operating mode, and both the inner lobe and the outer lobe are actuated during the rebreathe engine operating mode.

Figure 7:
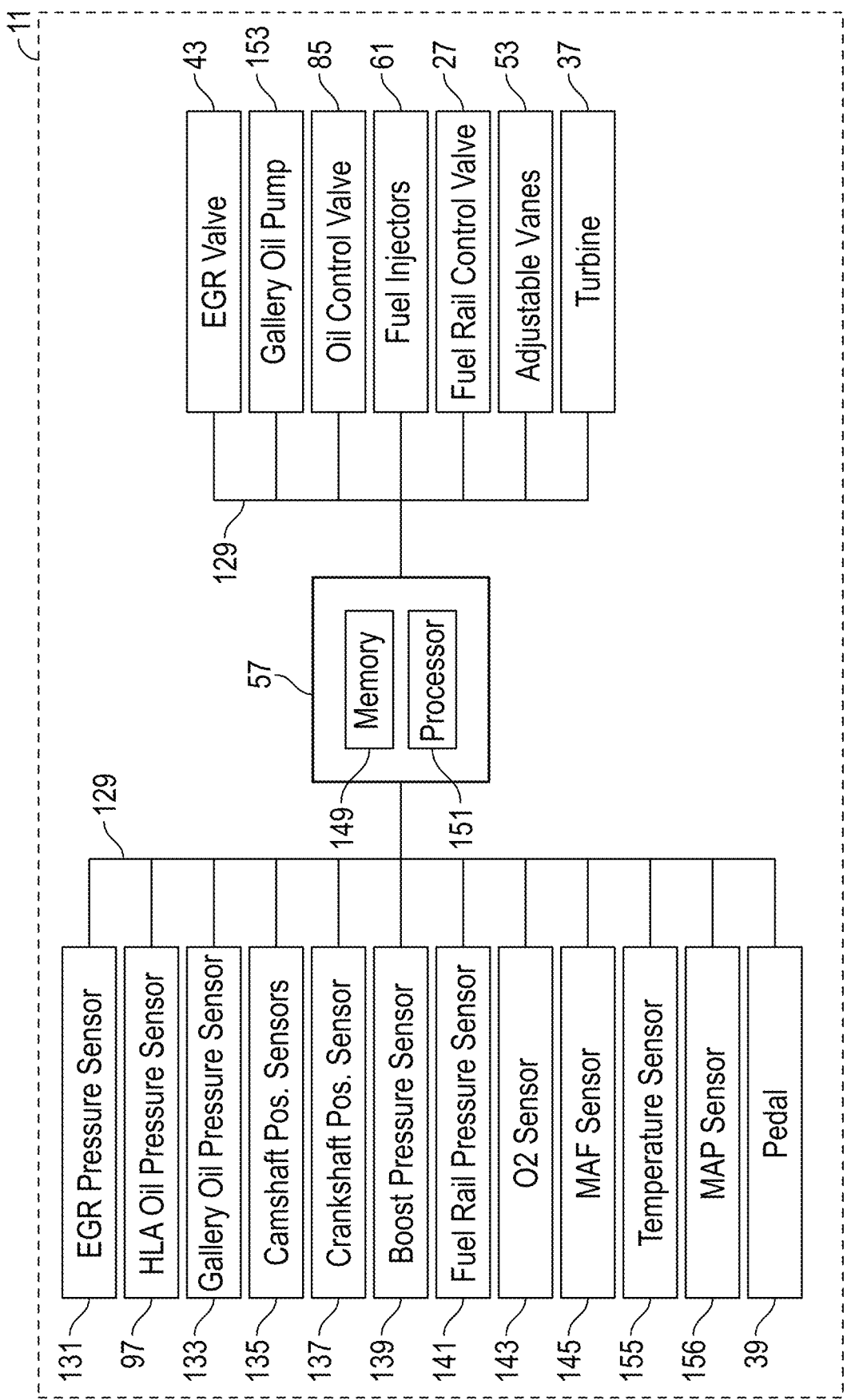
FIG. 7 depicts a block diagram of an engine in accordance with one or more embodiments disclosed herein.
Figure 8:
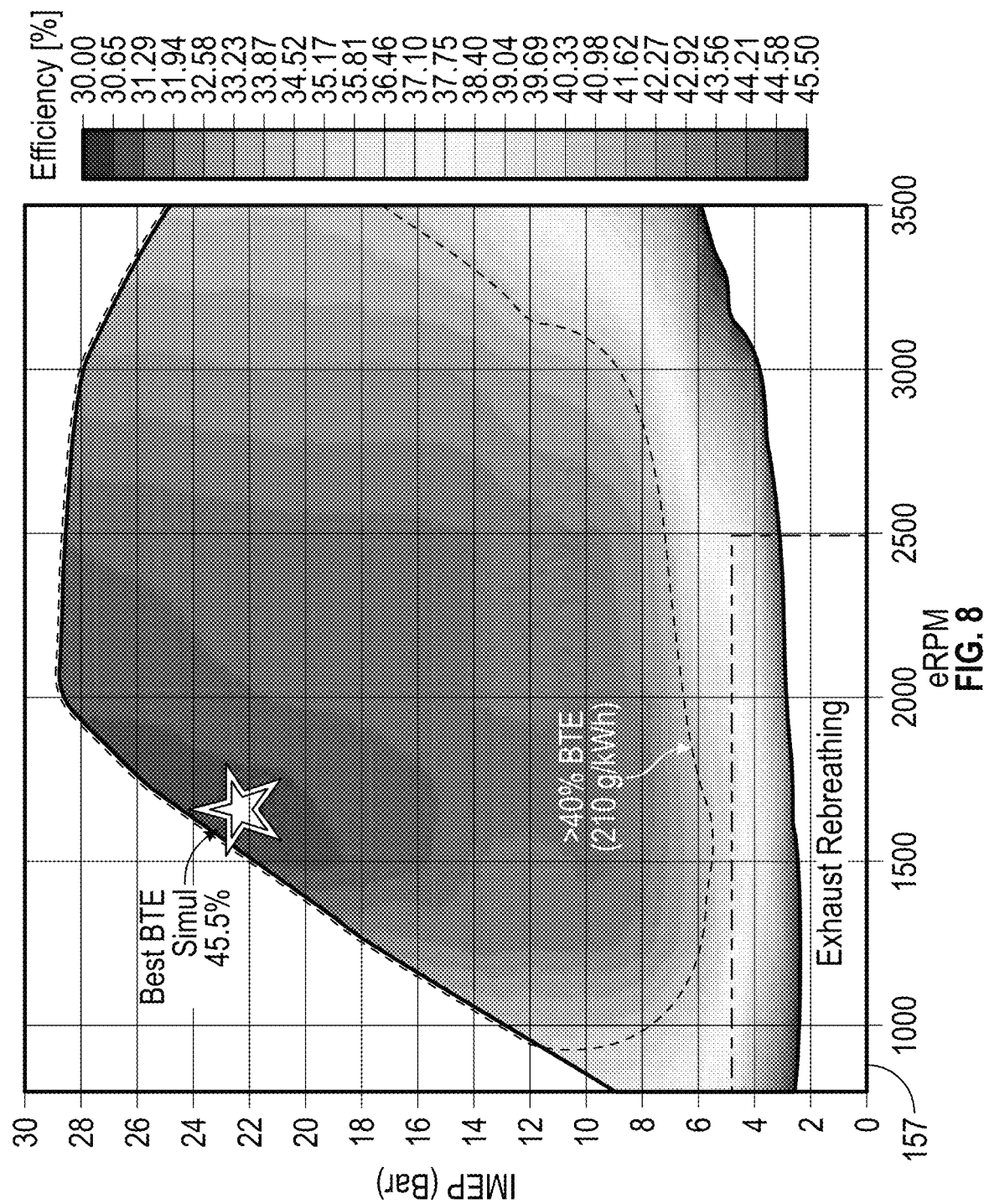
FIG. 8 depicts a fuel efficiency map in accordance with one or more embodiments disclosed herein.

Turning now to FIG. 7, FIG. 7 depicts a block diagram of various hardware components connected to the Electronic Control Unit (ECU) 57. As discussed above, the ECU 57 operates to control whether the engine 11 is operated in the typical engine operating mode or the rebreathe engine operating mode. Thus, FIG. 7 depicts hardware components that feed information or receive instructions from the ECU 57 in order to enable an operating mode transition. In this regard, components depicted in FIG. 7 as being connected to the left hand side of the ECU 57 represent sensors that feed information to the ECU 57. On the other hand, components connected to the right hand side of the ECU 57 represent actuatable components that are controlled by the ECU 57 to physically facilitate the operating mode transition. The various components of FIG. 7 are interconnected by way of a wiring harness 129, which is a bundle of wires that form electrical pathways between the ECU 57 and the various sensors and actuatable components discussed above.

For its part, the ECU 57 includes a memory 149 and a processor 151. The processor 151 is formed by one or more processors, integrated circuits, microprocessors, or equivalent computing structures that serve to execute computer readable instructions stored on the memory 149. Thus, the memory 149 includes a non-transitory storage medium such as flash memory, a Hard Disk Drive (HDD), a solid state drive (SSD), a combination thereof, or equivalent storage devices. In relation to the invention as described herein, the memory 149 stores computer readable instructions, executed by the processor 151, that relate to controlling the engine 11 to operate in the typical engine operating mode, to operate in the rebreathe engine operating mode, and to transition between the engine operating modes.

As shown in FIG. 7, the sensors include an EGR pressure sensor 131, a lash oil pressure sensor 97, a gallery oil pressure sensor 133, a camshaft position sensor 135, a crankshaft position sensor 137, a boost pressure sensor 139, a fuel rail pressure sensor 141, at least one O2 sensor 143, a Mass Air Flow (MAF) sensor 145, a pedal 39, a coolant temperature 155, and a Manifold Absolute Pressure (MAP) sensor 156. The EGR pressure sensor 131 may be embodied, for example, as a diaphragmatic pressure sensor that transmits a resistance reading to the ECU 57 that corresponds to the pressure difference of exhaust gases across the EGR valve 43. Based upon the measurements taken by the EGR pressure sensor 131, the ECU 57 controls the operation of the EGR valve 43 to regulate the amount of EGR gases fed to the intake manifold 17.

The functions of the lash oil pressure sensor 97 have been discussed previously above. Briefly, the lash oil pressure sensor 97 is disposed on one end of the second oil line 84, and serves to measure the interior oil pressure thereof. The oil pressure in the second oil line 84 is used to actuate the tri-roller RFFs 91. Additionally, the oil pressure in the second oil line 84 is regulated by the oil control valve 85 based upon instructions received from the ECU 57.

The gallery oil pressure sensor 133 serves to measure the pressure of oil in the Main Oil Gallery (MOG). To this end, the gallery oil pressure sensor 133 may be embodied as a diaphragmatic pressure sensor that transmits a resistance that corresponds to the pressure of oil in the MOG. As noted above, the lubrication system (not shown) of the engine 11 includes an oil pan (not shown), an oil distribution circuit (not shown) that extends throughout the engine 11, and a MOG that supplies oil to the main bearings (not shown) of the engine 11. The gallery oil pressure sensor 133 is positioned on the MOG to measure the overall oil pressure of the MOG.

The camshaft position sensors 135 are embodied as rotary encoders. The camshaft position sensors 135 are fixed to each of the intake camshaft 63 and the exhaust camshaft 65 such that each camshaft includes a corresponding camshaft position sensor 135. Thus, the camshaft position sensors 135 serve to capture the positions of the various camshafts 63 and 65, and each camshaft position sensor 135 transmits the current rotation angle of its associated camshaft to the ECU 57. Similarly, the crankshaft position sensor 137 is embodied as a rotary encoder that captures the current rotation angle and rotation speed of the crankshaft 75. As discussed above, the positions of the intake camshaft 63, the exhaust camshaft 65, and the crankshaft 75 are utilized by the ECU 57 to coordinate the timing of various operations of the combustion process. For example, based upon the position of the crankshaft 75 and the associated signal received from the camshaft position sensors 135, the ECU 57 determines the timing for operating the fuel injectors 61. As a second example discussed further below, the ECU 57 determines whether the engine 11 should be operated in the typical engine operating mode or the rebreathe engine operating mode based upon the rotation speed of the crankshaft 75, and actuates the oil control valve 85 according to the determined operating mode. The ECU 57 is not limited to determining the current engine operating mode based upon a single parameter. In this regard, the ECU 57 may determine which operating mode should be selected based upon additional input such as, but not limited to, a desired emissions level or content, a user requested torque, a desired fuel economy, a desired thermal or mechanical efficiency, or other performance metrics discussed further below and appreciated by a person skilled in the art.

To measure the boost pressure created by the compressor 33, the engine 11 includes a boost pressure sensor 139. The boost pressure sensor 139 is embodied as a diaphragm pressure sensor similar to the EGR pressure sensor 131. In addition, the boost pressure sensor 139 is positioned downstream of the compressor 33, such that the boost pressure sensor 139 captures the absolute air pressure prior to the intake manifold 17. On the other hand, boost pressure is controlled, in part, by varying the angle of adjustable vanes 53 of the turbine 37. The adjustable vanes 53 are controlled by the ECU 57. The aperture of the adjustable vanes 53 is reduced to decrease exhaust flow through the turbine 37, and increased to allow more exhaust gases to rotate the turbine 37. The shape, number, and aperture range of the adjustable vanes 53 are determined as system design features.

Similar to the boost pressure sensor 139, the engine 11 includes a fuel rail pressure sensor 141 that measures the pressure of fuel in the fuel rail 25. The fuel rail pressure sensor 141 is also embodied as a diaphragm pressure sensor that measures the fluid pressure of the fuel prior to the fuel entering a fuel injector 61.

The O2 sensor 143 may take many forms depending on the particular configuration of the engine 11 and associated logistical concerns. As one example of an O2 sensor, the O2 sensor 143 may be embodied as a zirconia probe that captures a difference between the oxygen content of the exhaust gases and the oxygen content of the external environment. Based upon the oxygen content of the exhaust gases, the ECU 57 determines whether the combusted fuel mixture was fuel rich or lean, and may tailor subsequent engine cycles to elicit a desired oxygen content in the exhaust gas stream. As the O2 sensor 143 captures the oxygen content of the exhaust stream, the O2 sensor 143 is positioned in the exhaust pipe 23 or the exhaust manifold 19.

The MAF sensor 145 measures the amount of air that enters the air intake line 21 from the external environment of the engine 11. To this end, the MAF sensor 145 may be embodied as including a heated wire (not shown) and a reference wire (not shown). The heated wire is cooled by the air entering the air intake line 21, such that the temperature of the heated wire is a function of the volume of air flowing by the heated wire. On the other hand, the reference wire has a temperature that corresponds to the external environment temperature. The MAF sensor 145 transmits the difference in temperature between the heated wire and the reference wire to the ECU 57, which allows the ECU 57 to determine the amount of air that enters the engine 11 as a whole. Similarly, the MAP sensor 156 determines the pressure of compressed air in the intake manifold. The MAP sensor 156 may be embodied as a piezoresistive pressure sensor, and is fixed to the intake manifold 17.

The coolant temperature 155 captures the operating temperature of the engine 11. The coolant temperature 155 may be embodied, for example, as a thermistor that outputs a resistance corresponding to the temperature of the coolant (not shown) flowing through the engine 11. To accurately measure the coolant temperature, the coolant temperature 155 may be positioned adjacent to or integrated with a thermostat (not shown) connected to a fluid outlet (not shown) of the engine block 13. Thus, the coolant temperature 155 measures the temperature of the coolant (not shown) immediately after the coolant exits the engine block 13.

As discussed further below, based upon readings taken from the above described sensors and/or input from the pedal 39, the ECU 57 controls the operation of the high-pressure fuel pump 27, the turbine 37, the EGR valve 43, the adjustable vanes 53, the fuel injector 61, the oil control valve 85, and the gallery oil pump 153 in a cohesive manner. Collectively, the cohesive operation of the high-pressure fuel pump 27, the turbine 37, the EGR valve 43, the adjustable vanes 53, and the fuel injector 61 by the ECU 57 facilitates lean operation of the engine 11 with EGR dilution. On the other hand, the cohesive operation of the oil control valve 85 and the gallery oil pump 153 according to measurements taken by the above discussed sensors serves to facilitate the transition between engine operating modes, as well as to adequately lubricate various components of the engine 11.

FIG. 8 depicts an engine map in accordance with one or more embodiments of the invention. The engine map forms a visual example of control logic that is utilized by the ECU 57 to facilitate the engine operating mode transition. As shown in FIG. 8, the engine map depicts a plot of the Brake Thermal Efficiency (BTE) as a function of the Indicated Mean Effective Pressure (IMEP) of the engine 11 and the Revolutions Per Minute (RPM) of the crankshaft 75. As is commonly known in the art, the IMEP of the engine 11 is derived, in part, from the torque produced by the crankshaft 75 of the engine 11 and the collective displacement volume of the cylinders 15. The IMEP reflects the generalized capacity of the engine 11 to output work, which is related to the internal pressure acting upon the pistons 71. In other words, FIG. 8 depicts the thermal efficiency of the engine 11 as a function of the load on the pistons 71 and the operating speed of the engine 11.

The engine map depicted in FIG. 8 also depicts a boundary 157 that delimits the operating conditions for the rebreathe engine operating mode. In particular, the boundary 157 encompasses the lower left corner of the engine map, such that the rebreathe engine operating mode corresponds to engine 11 speeds of less than 2500 RPM and an IMEP of less than approximately 5 bar. These operating conditions encompass situations where the engine has a low load or has not reached a sufficient operating temperature (i.e., cold start conditions), for example. Low load conditions may include situations where the engine 11 is stopped and idling, or while the engine 11 is operated at a consistent speed and produces a relatively low torque (e.g., when a vehicle (not shown) containing the engine 11 drives on a highway). When the engine 11 is required to operate outside of the operating conditions encapsulated by the boundary 157, the ECU 57 controls the engine 11 to operate in the typical engine operating mode.

Figure 9:
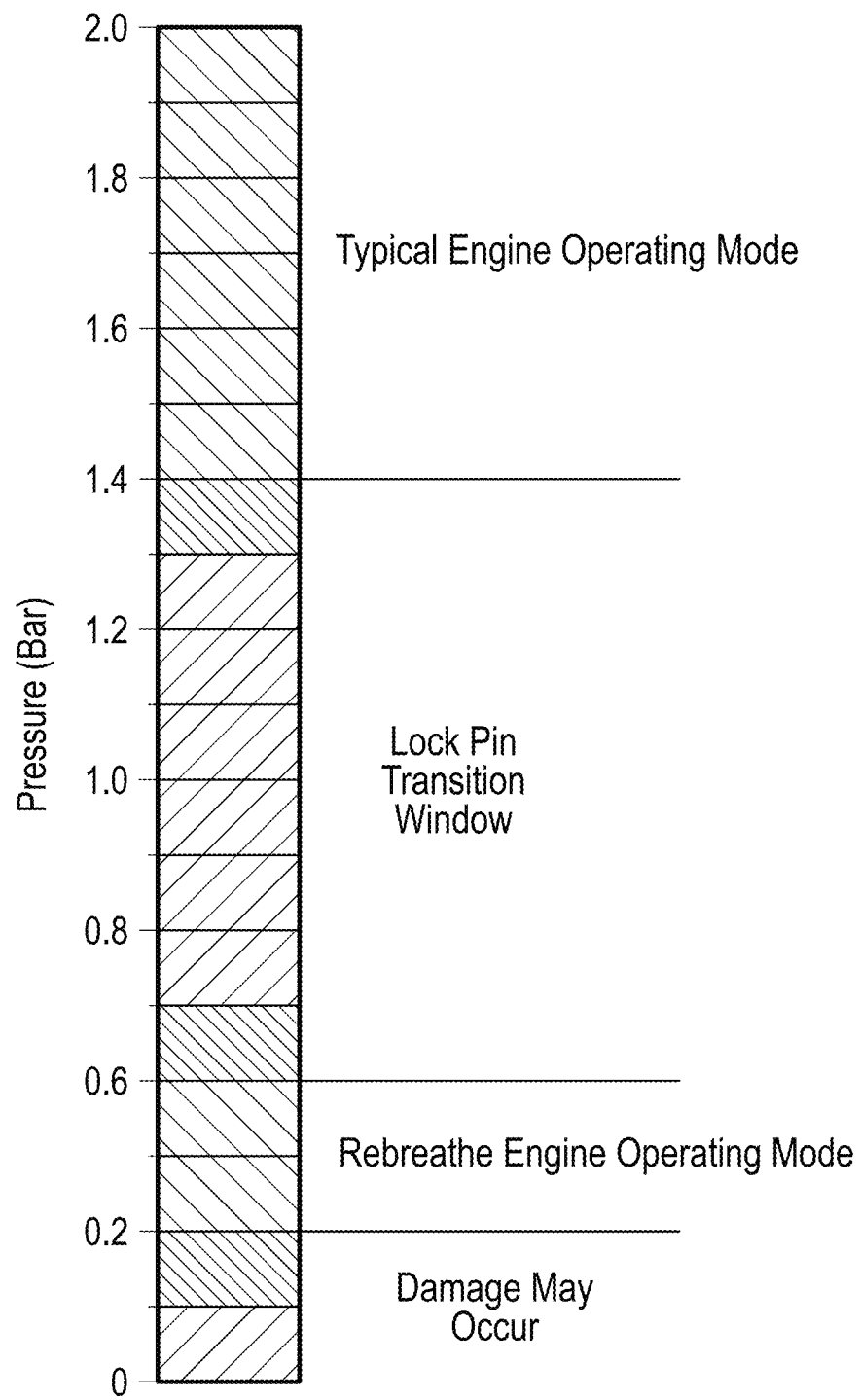
FIG. 9 depicts an operating mode pressure map in accordance with one or more embodiments disclosed herein.

FIG. 9 depicts a graph representing internal oil pressures for the second oil line 84 and the lash adjusters 89 that facilitate the actuation of the lock pin 109. As discussed above, the operating pressure of the lash adjusters 89 is a function of the oil pressure in the second oil line 84, which is controlled by the oil control valve 85. The oil supplied by the lash adjusters 89 causes lock pins 109 to withdraw into their respective cavities 111. Based upon the position of the lock pin 109 (i.e., whether the lock pin 109 is actuated to the first position or withdrawn to the second position), the engine 11 is operated in either the rebreathe engine operating mode or the typical engine operating mode, respectively.

As shown in FIG. 9, the ideal operating pressure of the second oil line 84 for the rebreathe engine operating mode is between 0.2 bar and 0.6 bar, inclusive. On the other hand, FIG. 9 also depicts that the ideal operating pressure for the typical engine operating mode is between 1.4 bar and 2.0 bar, inclusive. FIG. 9 further depicts that the pressure associated with the typical engine operating mode is higher than the pressure associated with the rebreathe engine operating mode. It is desirable to avoid sustaining the operating pressures in the lock pin transition window (e.g., 0.6 bar to 1.4 bar) because it will be unknown whether the lock pin 109 is withdrawn, extended, or located in an intermediate position.

However, the above pressures are necessarily dependent upon the orientation of the lash adjuster 89 in relation to the tri-roller RFF 91. For example, and returning to FIG. 5B, the cavity 111 may be formed in such a way that oil is introduced behind the lock pin 109, rather than introduced on the front side of the lock pin 109 as currently depicted. In such a case, a high operating pressure corresponds to the rebreathe engine operating mode, whereas a low pressure corresponds to the typical engine operating mode. As the low operating pressure corresponds to the "default" operation mode, the engine 11 may be configured in such a way so as to default to the typical engine operating mode or the rebreathe engine operating mode. The default operating mode is the mode that the engine 11 is initially operated in, such that the default operating mode corresponding to the rebreathe engine operating mode further corresponds to the cold start conditions discussed above.

FIG. 9 further depicts that pressures below the rebreathe engine operating mode pressures (i.e., less than 0.2 bar) may cause damage to the engine 11. This is because low oil pressure may not be sufficient for the lash adjuster 89 to remain extended under valvetrain loading. Additionally, oil lubrication will also be decreased at low oil pressure, which could lead to bearing 107 failure in the tri-roller RFF 91. Thus, it is desirable to avoid minimal operating pressures for purposes of not damaging components of the engine 11.

Figure 10:
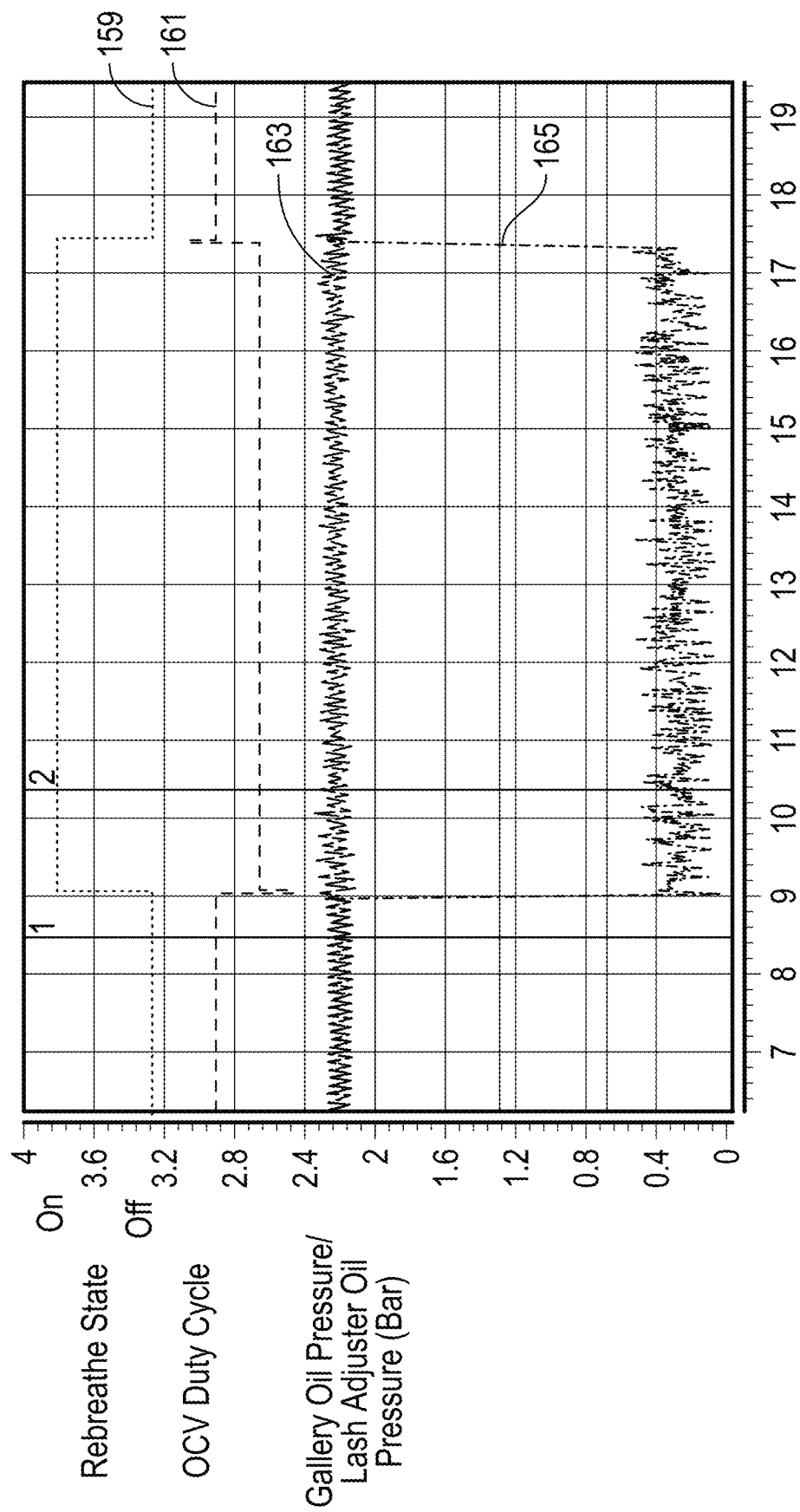
FIG. 10 depicts an oil pressure plot in accordance with one or more embodiments disclosed herein.

Turning to FIG. 10, FIG. 10 depicts a plot of oil control and response signals of the engine 11 as a function of time. The uppermost line of FIG. 10, referred to below as the rebreathe state line 159, depicts a status of the engine operating mode as a "rebreathe state". When the rebreathe state is "on", the rebreathe engine operating mode is active.

When the rebreathe state is "off", the typical engine operating mode is active. As discussed above, the selection of the engine operating mode is facilitated by the ECU 57 instructing the oil control valve 85 to actuate to a specific aperture such that the oil in the second oil line 84 has a high or low operating pressure that corresponds to the selected mode. In the example provided by FIG. 10, the rebreathe state is off for approximately the first 9 seconds of the engine 11 operation, on from approximately 9 seconds to 17.5 seconds, and off from 17.5 seconds onward. Thus, FIG. 10 encompasses a transition from a typical engine operating mode (i.e., rebreathe state "off") to a rebreathe engine operating mode (i.e., rebreathe state "on"), and vice versa.

FIG. 10 further depicts various signal responses as a function of the rebreathe state and transitions thereof. In this regard, FIG. 10 depicts an OCV duty cycle line 161, a gallery oil pressure line 163, and a lash adjuster oil pressure line 165. The OCV duty cycle line 161 corresponds to the actuation of the oil control valve 85, such that peaks of the OCV duty cycle line 161 correspond to a full operation of the oil control valve 85 and valleys of the OCV duty cycle line 161 correspond to not operating the oil control valve 85. As shown in FIG. 10, the OCV duty cycle line 161 indicates that the oil control valve 85 is operated with a relatively high duty cycle for the first 9 seconds when the rebreathe state is off such that there is additional oil pressure to maintain the lock pin 109 in the extended position and facilitate the typical engine operating mode. While the rebreathe state is on, the OCV duty cycle line 161 indicates that the oil control valve 85 is operated with a relatively low duty cycle.

During the transition from rebreathe off to rebreathe on, the OCV duty cycle line 161 drops to a minimum value (e.g., 0). This corresponds to the oil control valve 85 being fully closed to rapidly drop the pressure of the second oil line 84. On the other hand, the OCV duty cycle line 161 rises to a peak during the transition from rebreathe on to rebreathe off. This corresponds to the oil control valve 85 being fully opened to rapidly increase the operating pressure of the second oil line 84. As demonstrated in FIG. 10, the valleys and peaks corresponding to full or zero aperture of the oil control valve 85 are short in duration, which is due to the transition between engine operating modes occurring over the course of a single engine cycle. While the cycle timing depends on the engine 11 speed (i.e., the crankshaft 75 rotation speed), an engine operating mode transition window is typically less than 60 milliseconds (ms). Thus, the maximum apertures of the oil control valve 85 are sustained for less than 60 ms, and the actual duration of the maximum aperture will decrease as the engine 11 speed increases. Overall, FIG. 10 depicts that the engine 11 includes fast actuators with a response time on the order of milliseconds to enable mode switching.

The OCV duty cycle line 161 and the resulting operation of the oil control valve 85 causes the pressure to the lash adjuster 89 and second oil line 84 to drop dramatically during a rebreathe on state. To this end, the oil pressure line 165 is maintained at a substantially constant pressure during the rebreathe on and off states. However, when the rebreathe state transitions from on to off, the pressure rises from a first steady state pressure to a second steady state pressure. The first steady state pressure corresponds to the decreased pressure in the lash adjuster 89 that causes the lock pin 109 to withdraw into the cavity 111 and the second steady state pressure is similar or equivalent to the pressure in the MOG.

Figure 11:
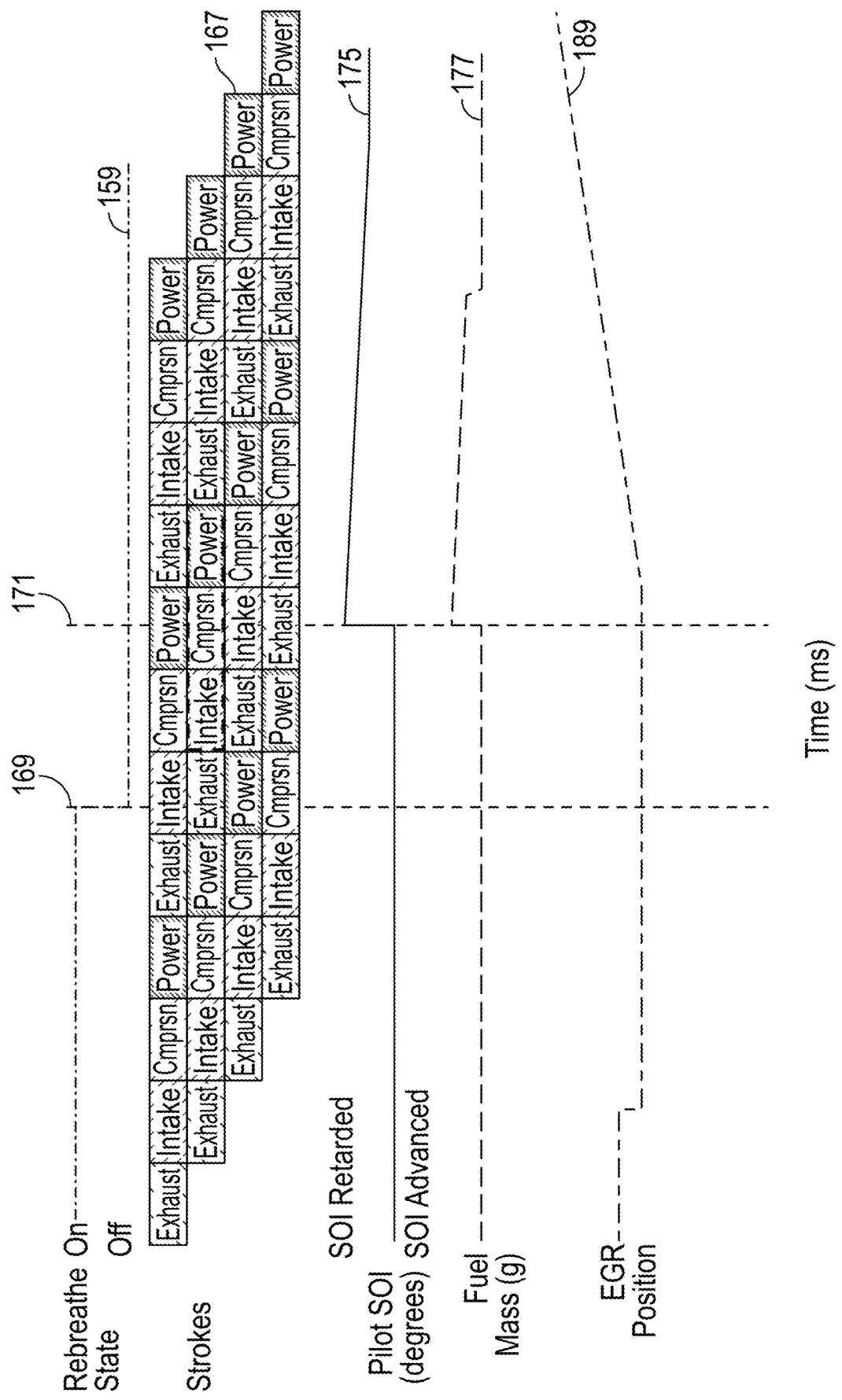
FIG. 11 depicts a stroke map of an engine in accordance with one or more embodiments disclosed herein.

Turning to FIG. 11, FIG. 11 depicts a plot of fuel related operation timings and parameters for controlling an engine 11 to transition between engine operating modes in accordance with one or more embodiments of the invention. Whereas FIG. 10 focuses on oil pressures of the second oil line 84 and the MOG and encompasses a period of approximately twenty seconds, FIG. 11 depicts a series of three complete engine cycles, and thus the operations depicted in FIG. 11 occur over a time period measured in milliseconds (ms). FIG. 11 further depicts a period of time during which the engine 11 was previously operating, such that FIG. 11 depicts that the engine 11 is initially being operated in the rebreathe engine operating mode (i.e., rebreathe on), as indicated by the rebreathe state line 159.

As shown in FIG. 11, a stroke map 167 reflects the operation of each cylinder 15 in a time-series fashion. The stroke map 167 includes four rows, where each row corresponds to a particular cylinder 15 and the combustion reaction generated therein. The stroke map 167 starts with an exhaust phase for each cylinder 15, indicating that a combustion reaction has occurred previously while the engine 11 is operated in the rebreathe engine operating mode. As discussed above in relation to FIGS. 2A-2C, the engine 11 operates in a four stroke combustion process, such that the stroke map 167 depicts that each cylinder 15 goes through an intake phase, a compression phase, a power phase, and an exhaust phase.

FIG. 11 further depicts multiple signals that correspond to various operating parameters controlled by the ECU 57 and discussed above. For example, FIG. 11 depicts a rebreathe state line 159, which corresponds to the engine operating mode status. FIG. 11 also depicts a pilot Start of Injection (SOI) line 175 that represents the timing of the ECU 57 directing a first fuel injector 61 to spray fuel into a cylinder 15 as a function of the position of the crankshaft 75. Similarly, the fuel mass line 177 represents the amount of fuel, in grams (g), injected by the first fuel injector 61.

Events that occur during the process of operating the engine 11 are denoted by vertical lines within FIG. 11. For example, FIG. 11 depicts that a rebreathe engine operating mode is initially selected, and the ECU 57 facilitates the transition to the typical engine operating mode at a time denoted by a rebreathe end line 169. The rebreathe end line 169 corresponds to a point when the rebreathe state line 159 changes from an on state to an off state, indicating that the lock pin 109 is withdrawn into the cylinder 15. The timing of the fuel injector response to an actuating command issued by the ECU 57 is depicted as the fuel hardware reaction line 171. Thus, overall, FIG. 11 presents a time-series overview of fuel injection parameters during engine operating mode transitions.

For its part, the rebreathe end line 169 is positioned in FIG. 11 to indicate the time at which the ECU 57 has measured the oil change and calculated that the first cylinder (i.e., the cylinder represented by the top row of the stroke map 167) should be operated according to the typical engine operating mode. In juxtaposition, the fuel hardware reaction line 171 represents the time at which the ECU 57 has determined that the first cylinder 15 has transitioned from the intake stroke to the compression stroke, and the fuel strategy needs to be coordinated by the ECU 57 to correspond to the typical engine operating mode. As discussed above, the rebreathe transition process includes actuating the exhaust valve 69 on intake phases and exhaust phases that occur before the time represented by the rebreathe end line 169, and actuating the exhaust valve 69 only during exhaust phases (and not intake phases) occurring after the rebreathe end line 169.

As a result of the engine cycle starting with the intake phase, the first time that the fuel hardware will actuate according to the typical engine operating mode instead of the rebreathe engine operating mode is during the first compression phase that follows the rebreathe end line 169. In the case of FIG. 11, such is depicted by the fuel hardware reaction line 171 extending through a compression phase of the second row of the stroke map 167. During this compression phase and subsequent compression phases, the pilot fuel start of injection is advanced. As described herein, the phrase "retarded" and "advanced" are used to refer to engine timing. Advanced timing refers to operating the fuel injectors 61 earlier in the compression stroke, whereas retarded timing relates to operating the fuel injectors 61 later in the compression stroke. The timing is relative to the crankshaft 75 position, which is discussed previously in relation to FIG. 3.

Thus, FIG. 11 depicts that the fuel injector 61 timing is retarded during the engine operating mode transition, and the fuel SOI advances once the engine 11 is operating in the typical engine operating mode after the transition. Such is represented by the pilot SOI line 175 having a continuous plateau during the rebreathe on state indicated by the rebreathe state line 159, and the pilot SOI line 175 decreasing at a constant slope immediately after the fuel hardware reaction line 171.

Similarly, the fuel mass line 177 indicates that extra fuel is sprayed into the cylinder 15 during the transition between engine operating modes (i.e., during the compression stroke change), and the fuel mass decreases at a constant rate from the elevated mass fuel injection value after the fuel hardware reaction line 171. The extra fuel mass is achieved by the ECU 57 controlling the fuel injectors 61 to actuate for an increased duration. The extra fuel counteracts pumping losses associated with the turbo (e.g., the turbine 37 and the compressor 33) and the lag thereof, and allows the engine to maintain a pseudo-constant Brake Mean Effective Pressure (BMEP) (i.e., brake torque) throughout the transition. Such is advantageous for reducing engine jerk and shudder, creating a smooth torque response by the engine 11 throughout the transition process.

Finally, FIG. 11 depicts an EGR position line 189, which reflects the position of the EGR valve 43 based upon measurements from the EGR pressure sensor 131. As shown in FIG. 11, the EGR valve 43 position is reduced prior to the rebreathe end line 169 by reducing the aperture of the EGR valve 43. This compensates for EGR transport delay in the EGR system and ensures that EGR in the combustion chamber 73 is reduced by the time the mode transition occurs. The EGR valve 43 is held constant through the operating mode transition by maintaining the position of the EGR valve 43. After the transition, the EGR valve 43 is opened to dilute the mixture in the combustion chamber with burned gases, which decreases the combustion temperature and NOx output.

Figure 12:
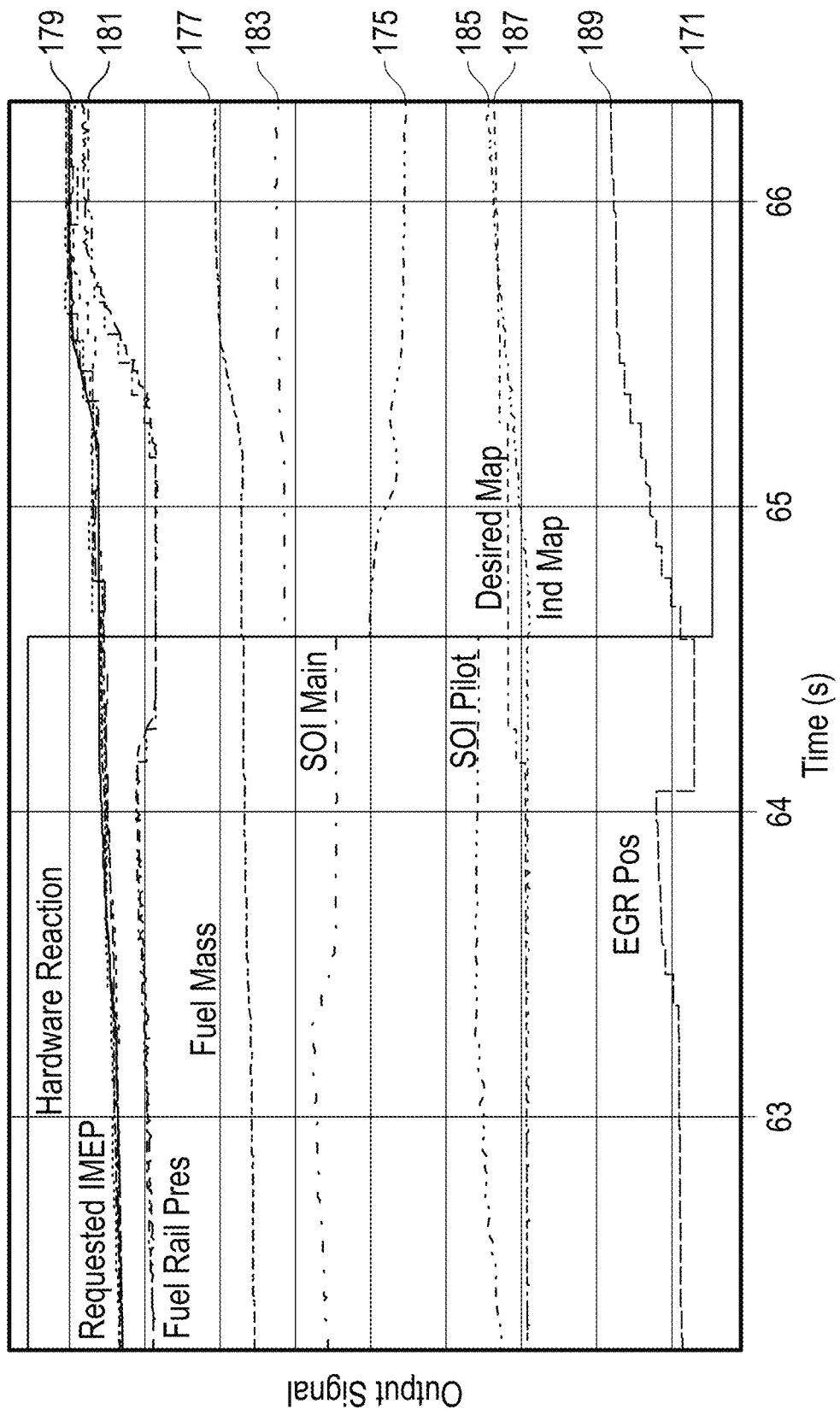
FIG. 12 depicts an output signal plot of an engine in accordance with one or more embodiments disclosed herein.

FIG. 12 depicts a signal plot of various engine operating parameters in relation to a rebreathe state. As noted above, FIG. 11 depicts a transition between engine operating mode occurring over the course of a few hundred milliseconds. In juxtaposition, FIG. 12 depicts signals of a transition between engine operating modes for the course of four seconds. Thus, FIG. 11 establishes specific actions that occur during a small transition window between engine operating modes, whereas FIG. 12 depicts a general difference in operating condition trends between the typical engine operating mode and the rebreathe engine operating mode.

As shown in FIG. 12, the engine operating mode transitions from a rebreathe engine operating mode to a typical engine operating mode at a time of approximately 64.5 seconds, as indicated by the fuel hardware reaction line 171. FIG. 12 further depicts various signal lines that represent the actuation or response of components of the engine 11 as a function of the operating mode transition. In this regard, FIG. 12 depicts a requested Indicated Mean Effective Pressure (IMEP) line 179, a fuel rail pressure line 181, a fuel mass line 177, a main SOI line 183, a pilot SOI line 175, a desired Manifold Absolute Pressure (MAP) line 185, an indicated MAP line 187, and a desired Exhaust Gas Recirculation (EGR) EGR position line 189, the functions of which are further discussed below.

The requested IMEP line 179 of FIG. 12 corresponds to the desired IMEP, which is the effective operating load of the engine 11 selected by the ECU 57 based upon the engine map depicted in FIG. 8. The IMEP corresponds to the capacity of the engine 11 to output work at the surface of the piston 71, such that a high IMEP indicates a larger work output and a low IMEP indicates a low work output. The requested IMEP is also a function of the pedal 39 position, which is controlled by the user of the engine 11. To this end, when the pedal 39 is depressed by a user, the ECU 57 increases the requested IMEP to increase the work output of the engine 11 and deliver the desired response. Within FIG. 12, it is seen that the requested IMEP line slowly increases during the rebreathe engine operating mode, remains substantially constant during the transition between operating modes (i.e., before the vertical portion of the rebreathe state line 159), and increases during the typical engine operating mode (i.e., after the vertical portion of the rebreathe state line 159). As noted above, the gradual increase in requested IMEP creates a smooth torque response in the engine 11 by avoiding engine vibration created by a rapid IMEP change. In addition, maintaining a constant IMEP during the operating mode transition allows the turbine 37 and compressor 33 to spool while the engine torque is held constant. While the turbine 37 and compressor 33 are spooling, the engine torque output may be supplemented by a hybrid electric motor (not shown) and battery (not shown) to avoid a loss of torque.

The fuel mass line 177 is discussed above in relation to FIG. 11, and indicates the amount of fuel injected by a particular fuel injector 61 in response to an instruction issued by the ECU 57. During the rebreathe engine operating mode, the injected fuel mass is decreased relative to the typical engine operating mode, which corresponds to the lower engine speeds associated with the decreased requested IMEP of the rebreathe engine operating mode. At the operating mode transition, the fuel mass line 177 jumps to an elevated value, and begins to decrease thereafter. The final portion of the fuel mass line 177 increases, which corresponds to the increased requested IMEP demonstrated by the requested IMEP line 179 during the typical engine operating mode and is unrelated to the operating mode change. That is, the final increased portion of the fuel mass line 177 corresponds to the user actuating the pedal 39 and the ECU 57 increasing the requested IMEP as a result thereof.

Similar to the fuel mass line 177, the fuel rail pressure line 181 depicts the pressure of the fuel in the fuel rail 25. The fuel rail pressure is controlled by the high-pressure fuel pump 27, and is captured by the fuel rail pressure sensor 141. During the rebreathe engine operating mode, the fuel rail pressure line 181 is gradually increased to follow the requested IMEP line 179. At a time approximately 300 ms prior to the engine operating mode transition, the fuel rail pressure line 181 decreases rapidly, and is maintained constant from a period of time from approximately 200 ms prior to the engine operating mode transition to a period of time approximately 500 ms after the engine operating mode transition. Thus, the fuel rail pressure is maintained constant for a period of time before, during, and after the ECU 57 controls the engine 11 to exit the rebreathe engine operating mode. The decrease of injection pressure occurs to promote combustion, but can degrade emissions if sustained or excessive. Therefore, the fuel rail pressure line 181 is controlled by the ECU 57 to hit the low point immediately prior to the engine operating mode transition and until boost pressure is built up by the compressor 33 to sustain combustion. After the transition, the fuel rail pressure line 181 recovers to closely align with the requested IMEP line 179.

The main SOI line 183 and the pilot SOI line 175 correspond to the Start of Injection (SOI) of the various fuel injectors 61. In particular, the main SOI line 183 corresponds to the SOI of the second injection for the fuel injectors 61, while the pilot SOI line 175 corresponds to the SOI of the first injection for the fuel injectors 61. Both the main SOI line 183 and the pilot SOI line 175 depict that the SOI for the rebreathe engine operating mode is advanced compared to the SOI for a typical engine operating mode. That is, the magnitudes of the main SOI line 183 and the pilot SOI line 175 are decreased, corresponding to an overall advanced timing, during the rebreathe engine operating mode. Thus, overall, FIG. 12 depicts that the SOI of the typical engine operating mode is controlled by the ECU 57 to be retarded compared to the SOI of the rebreathe engine operating mode.

During the transition between engine operating modes, the main SOI line 183 and the pilot SOI line 175 increase sharply, indicating that the fuel SOI is retarded during the engine operating mode transition. The retarded timing promotes combustion by compensating for the low boost pressure and allows the additional fuel that is sprayed during the transition to be adequately combusted. The immediate and sharp increase in the pilot SOI line 175 and the main SOI line 183 reflects the switch from between engine operating modes. After the transition, the pilot SOI line 175 decreases for approximately 0.75 seconds, which reflects the pilot SOI advancing to return to a steady state for the combustion process in the typical engine operating mode.

The desired MAP line 185 and the indicated MAP line 187 represent the requested and measured values of the pressure of the intake manifold. The intake manifold pressure is facilitated by the position of the compressor 33, which is controlled by the ECU 57 and turbine 37 in response to a user request, an engine map, or other control logic. The Start of Injection (SOI), the fuel pressure, the fuel quantity and the EGR flow are controlled during engine operating mode transitions based upon a difference between the desired MAP line 185 and the indicated MAP line 187. Specifically, during the rebreathe engine operating mode, the desired MAP line 185 and the indicated MAP line 187 are substantially constant, indicating a constant air pressure in the intake manifold. At a time approximately 300 ms prior to the transition, which is approximately the same time as the fuel rail pressure line 181 decreases, the desired MAP line 185 increases corresponding to the ECU 57 controlling the turbine 37 and compressor 33 to introduce additional compressed air into the intake manifold 17. Due to hardware delays, the resultant change is not seen in the indicated MAP line 187 until shortly after the engine operating mode transition indicated by the fuel hardware reaction line 171. The extra air pressure is scheduled by the ECU 57 in response to the anticipated changes in SOI timing and fuel mass discussed above.

The EGR position line 189 corresponds to the requested position of the EGR valve 43 based upon measurements from the EGR pressure sensor 131. At a time approximately 1.2 seconds prior to the engine operating mode transition, extra EGR is scheduled by the ECU 57 opening the EGR valve 43, resulting in an increase in the slope of the EGR position line 189. The extra EGR corresponds to the rising IMEP request in anticipation of the engine operating mode transition. This behavior continues for approximately 600 ms, after which the EGR valve 43 drops drastically, and is maintained at a constant value for the remaining 600 ms prior to the engine operating mode transition. The above description of the EGR position line 189 reflects that the EGR valve 43 is quickly actuated to a reduced aperture, which is maintained for the 600 ms period before the engine operating mode transition. The reduced constant aperture transiently removes EGR gases from subsequent combustion reactions occurring during and after the transition. EGR demotes combustion, therefore removing EGR transiently during the rebreathe engine operating mode exit promotes combustion of the fuel mixture during the transition process.

Figure 13:
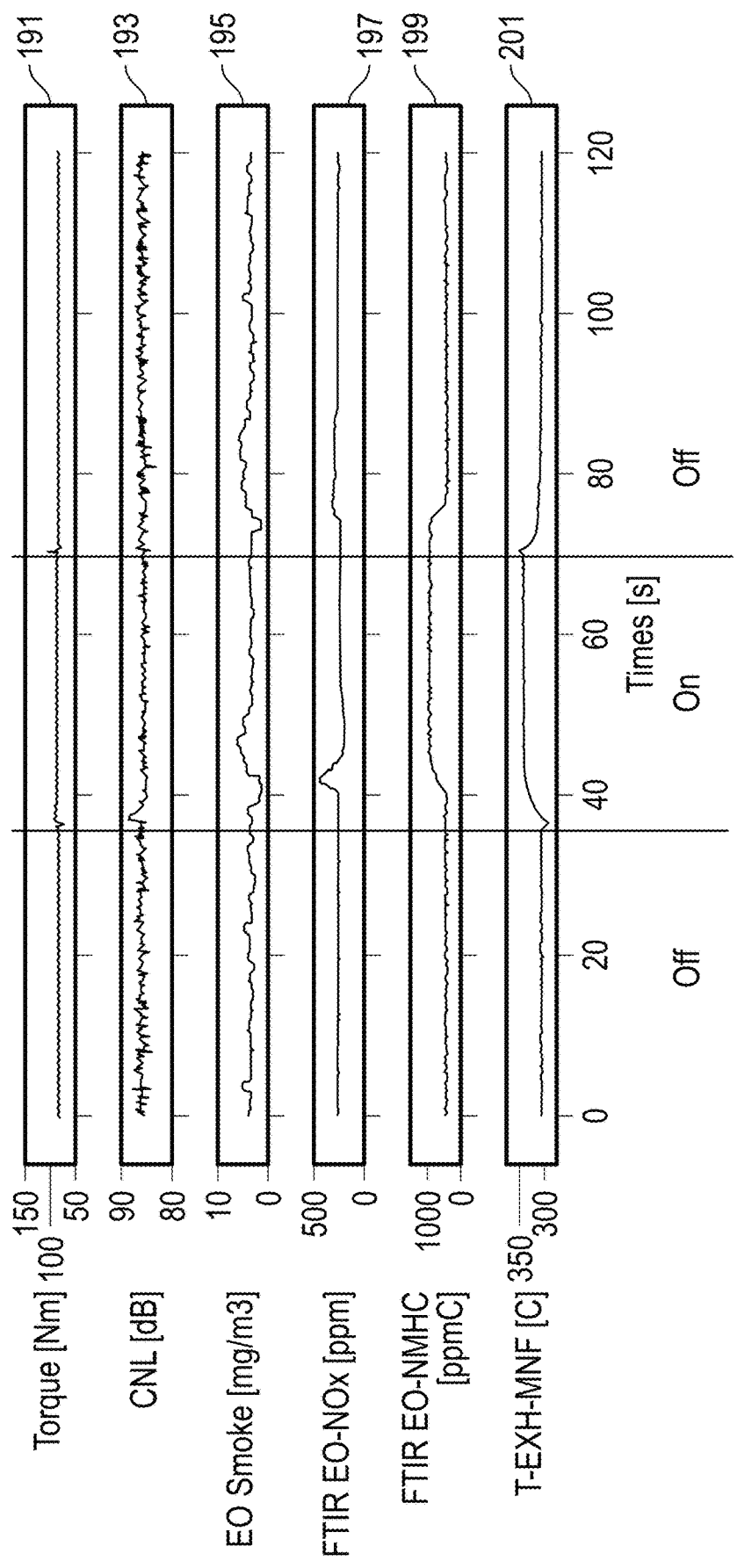
FIG. 13 depicts an engine emissions plot in accordance with one or more embodiments disclosed herein.

FIG. 13 presents a series of plots related to user comfort and emissions as a function of transitioning between engine operating modes. The plots of FIG. 13 are segmented into three portions: a first typical engine operating mode portion, a rebreathe engine operating mode portion, and a second typical engine operating mode portion. Thus, FIG. 13 depicts a period of time, in seconds(s), when the engine 11 transitions from the typical engine operating mode to the rebreathe engine operating mode and subsequently transitions from the rebreathe engine operating mode back to the typical engine operating mode. The series of plots depicted in FIG. 13 includes a torque plot 191, a combustion noise level plot 193, an Engine Out (EO) smoke plot 195, an EO-NOx plot 197, an Engine Out Non-Methane Hydrocarbons (EO-NMHC) plot 199, and an exhaust temperature plot 201. Values appearing in the plots of FIG. 13 are derived from dynamometer measurements and calculations in order to represent the anticipated real-world performance of the engine 11.

Initially, FIG. 13 depicts that the torque plot 191 remains relatively constant throughout the engine operating mode transitions. The torque plot 191 corresponds to the output torque produced by the crankshaft 75. The pseudo-constant torque implies that the engine 11 will not experience substantial jerks or shuddering while transitioning between engine operating modes. As a result of the reduced engine shudders, a user of the engine 11 (i.e., a driver of a vehicle containing the engine 11) will have pleasing experience despite the engine operating mode transitions. In addition, components that are used to attach or retain an engine 11 (e.g., engine mounts) will have reduced wear as a result of the smooth torque profile.

Similarly, the combustion noise level plot 193 also remains at a near constant level throughout the engine operating mode transitions, and the noise level continuously remains between 80 and 90 decibels (dB). Thus, the engine 11 does not exhibit a substantial increase in noise output as a result of the engine operating mode transitions. Indeed, it can be seen in FIG. 13 that the magnitude of the combustion noise level plot 193 experiences more deviation during the typical engine operating mode, such that the rebreathe engine operating mode offers less noise level variation when compared to the typical engine operating mode.

During normal operation in the typical engine operating mode and the rebreathe engine operating mode, the EO smoke plot 195 experiences minor dips and spikes. While the data indicates very low levels of smoke, the EO smoke plot 195 exhibits a substantial valley and corresponding peak appearing immediately after transitioning from the typical engine operating mode to the rebreathe engine operating mode. The valley has a sustained magnitude that outweighs that of the corresponding peak, such that as a whole the EO smoke decreases when operating in the rebreathe engine operating mode. Thus, the rebreathe engine operating mode advantageously reduces EO smoke output of the engine 11, which provides emissions benefits by avoiding unnecessary EO smoke. As a result of the rebreathe engine operating mode being used in low load and cold start conditions, the reduced EO emissions can be achieved during routine and everyday use of the engine 11 without needing to reduce the requested power and torque output of the engine 11.

The EO-NOx plot 197 is similar to the EO smoke plot 195, as both plots depict that detrimental emissions are reduced during the rebreathe engine operating mode. The EO-NOx plot 197 is denoted in FIG. 13 as being an "FTIR EO-NOx" plot, which symbolizes that the EO-NOx plot 197 represents Fourier Transform infrared spectroscopic data that captures the amount of EO-NOx present in emissions in Parts Per Million (ppm). While the EO smoke plot 195 depicts a large valley immediately following the engine operating mode transition, the EO-NOx plot 197 depicts an increase in EO-NOx immediately following the transition and a lengthy decrease thereafter. The decrease in EO-NOx outweighs the increase in EO-NOx, implying that the engine 11 also has a decreased EO-NOx output while operating in the rebreathe engine operating mode. Such is beneficial from an emissions perspective, as an engine 11 equipped with a rebreathe engine operating mode will have a reduced emissions output compared to an engine that does not operate in a rebreathe mode.

The EO-NMHC plot 197 represents the amount of Engine Out (EO) Non-Methane Hydrocarbon (NMHC) emissions generated by the engine 11. As shown in FIG. 13, the EO-NMHC increases during the rebreathe engine operating mode to a value of approximately 1000 parts-per-million Carbon atoms (ppmC). Once the engine 11 returns to the typical engine operating mode, the EO-NMHC decreases to a value of approximately 400 ppmC.

The exhaust temperature plot 201 reflects the temperature of exhaust gases emitted by the engine 11 during the typical and rebreathe engine operating modes. The exhaust temperature plot 201 depicts that the exhaust temperature typically has a range of 300-350° C. When rebreathe is off and the engine 11 is operated in the typical engine operating mode, the exhaust gases have a temperature of approximately 300° C. On the other hand, when the engine 11 is operated in the rebreathe engine operating mode the exhaust temperature plot 201 depicts that the exhaust gases have a temperature of 350° C.

The increased exhaust temperature of the exhaust gases during the rebreathe engine operating mode occurs due to hot exhaust gases being reintroduced to a cylinder 15 during the rebreathe engine operating mode, causing the engine 11 to operate with an increased operating temperature. The temperatures created by the rebreathe engine operating mode significantly increases exhaust temperatures to maintain active catalysis in the after-treatment device 55 and similar emission management processes for ultralow tailpipe emissions. Due to higher engine 11 and exhaust temperatures during the rebreathe engine operating mode, tailpipe exhaust Hydrocarbon (HC), Carbon Monoxide (CO), and Nitrogen Oxide (NOx) content is significantly reduced, while combustion robustness and stability also improve.

Figure 14:
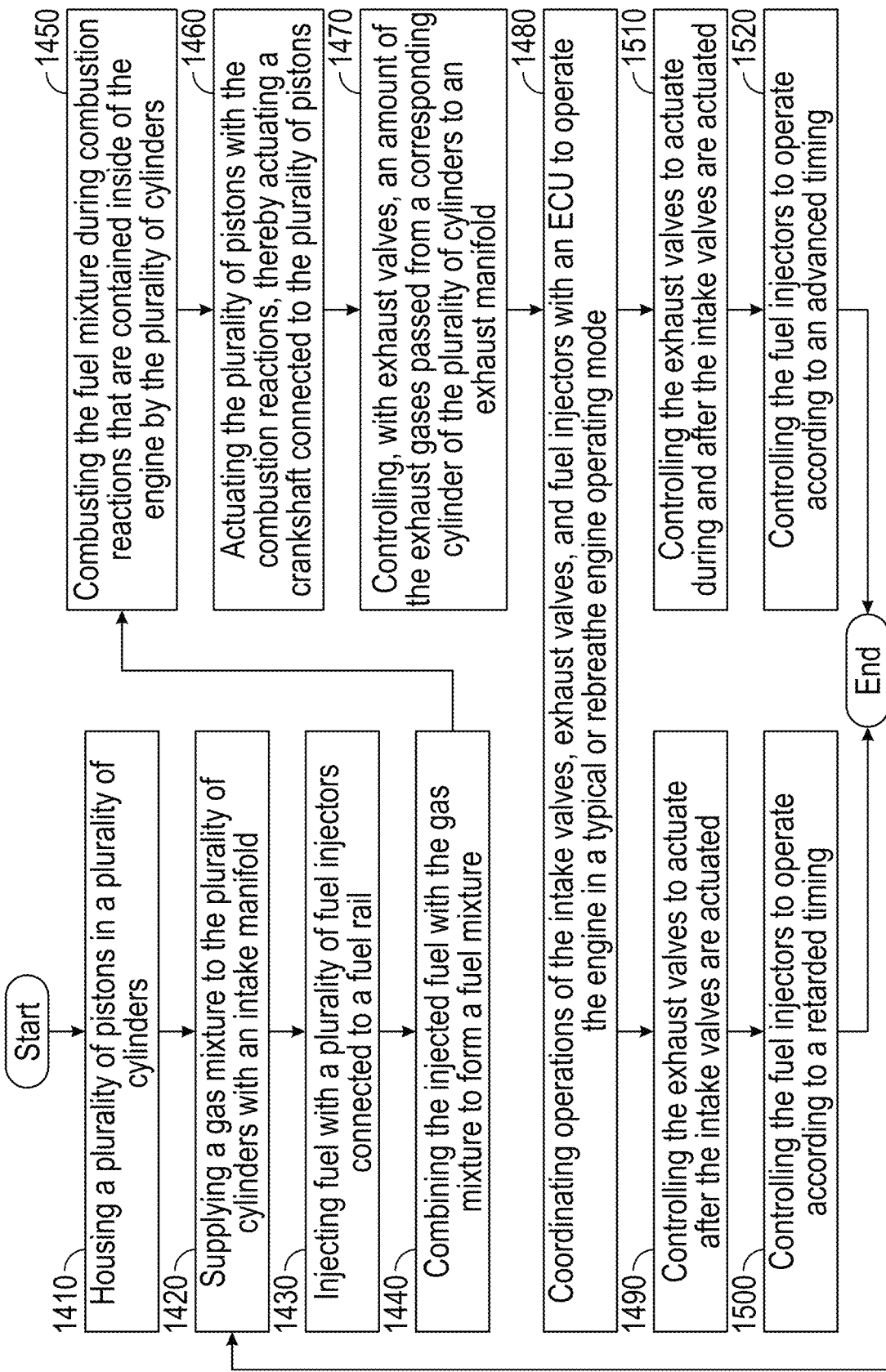
FIG. 14 depicts a method for operating an engine in accordance with one or more embodiments disclosed herein.

Turning to FIG. 14, FIG. 14 depicts a method for operating an engine 11 in accordance with one or more embodiments of the invention disclosed herein. Steps of FIG. 14 may be performed, for example, using the aforementioned engine 11, but are not limited thereto. The constituent steps of the method depicted in FIG. 14 may be performed in any logical order, and are not limited to the sequence presented. Furthermore, the steps of FIG. 14 may encompass multiple additional actions not depicted that are routine in the art. Moreover, multiple steps of FIG. 14 may be performed as part of a single action, or a single step may comprise multiple actions.

The method of FIG. 14 initiates with Step 1410, which involves housing a plurality of pistons 71 in a plurality of cylinders 15. Each cylinder 15 houses a corresponding piston 71 of the plurality of pistons 71 and forms a containment boundary for a corresponding combustion reaction. The cylinders 15 are formed as orifices disposed within an engine block 13 of the engine 11, such that the containment boundary is formed by a sidewall of the cylinder 15. The pistons 71 are positioned within the cylinders 15, where the cylinders 15 guide the motion of the pistons 71 during the combustion reaction. As discussed below, the combustion reaction involves compressing a fuel mixture until a point in time at which the fuel mixture auto-ignites, which is referred to as compression ignition. It is to be understood that the engine 11 may also be operated with the aid of a spark plug to facilitate the generation of the combustion reaction without deviating from the nature of this specification.

In step 1420, a gas mixture is supplied to the plurality of cylinders 15 with an intake manifold 17. The gas mixture includes air received from an air intake line 21, which may be compressed by a compressor 33 prior to entering the intake manifold 17. The gas mixture may further include exhaust gases recirculated to the inlet of the compressor 33 by way of an EGR line 41. The intake manifold 17 is formed as a plenum with a single input connected to the air intake line 21 and multiple outputs, where each output connects to a separate cylinder 15. An amount of the gas mixture to be supplied to each cylinder 15 is controlled with a corresponding intake valve 67 of a plurality of intake valves 67. As discussed above, the intake valves 67 are formed with a conical portion that is selectively actuated to create a fluid passageway from the intake manifold 17 to a particular cylinder 15. Once the gas mixture is received in the cylinders 15, the method proceeds to step 1430.

In step 1430, fuel is injected into the cylinders 15 with a plurality of fuel injectors 61 connected to a fuel rail 25. The fuel injectors 61 are each positioned to inject fuel into a corresponding cylinder 15. As described herein, the phrase "fuel" refers to a flammable liquid, such as gasoline, petrol, or diesel, that combusts during the combustion reaction when combined with the above discussed gas mixture and subjected to a pressure and temperature increase within the cylinder 15. The fuel injectors 61 may be embodied, for example, as solenoid valves that selectively spray fuel into the cylinders 15. Each fuel injector 61 is connected to the fuel rail 25, which receives fuel from a storage reservoir such as a fuel tank. After fuel is sprayed into a cylinder 15, the method of FIG. 14 proceeds to step 1440.

In step 1440, the injected fuel is combined with the gas mixture to form a fuel mixture. Step 1440 is assisted by the upward motion of the pistons 71 during a compression phase of the engine cycle, which increases the fluid motion of the injected fuel and the gas mixture. The injected fuel and the gas mixture are combined within each cylinder 15, and occupy the volume of the cylinder 15 above the pistons 71 and below the valves 67 and 69. Once the injected fuel and gas mixture is combined, the method proceeds to step 1450.

In step 1450, the fuel mixture formed in step 1440 is combusted. The combustion reactions resulting from the combustion of the fuel mixture are contained within the engine 11 by way of the cylinders 15, which form a containment boundary for the combustion reactions as discussed in relation to step 1410. Combustion is generated by compressing the fuel mixture with the pistons 71 until the fuel mixture reaches an auto-ignition point, which initiates the power phase of the engine cycle. Once the combustion reaction is generated within the engine 11, the method proceeds to step 1460.

In step 1460, the pistons 71 are actuated by the combustion reactions of step 1450. It is noted that each combustion reaction will occur at a separate time based upon the particular cylinder 15 used to create the combustion reaction. Specifically, and as discussed in relation to FIG. 11, each cylinder 15 and its associated piston 71 are operated at different phases of the engine cycle. This provides a balanced combustion approach that ensures that the pistons 71 are collectively operated in a manner that generates a sustained power output. In the context of FIG. 14, the cyclic nature of the combustion reactions requires that steps 1410-1460 occur at differing points of time that correspond to the current phase of a particular cylinder 15 and its associated piston 71. That is, because each cylinder 15 contains a different combustion reaction, and the combustion reactions are staggered in a time-orientated fashion, each cylinder 15 and piston 71 will be operated at a separate step of steps 1410-1460 during the process of operating the engine 11. The resulting actuation of the pistons 71 is received by a crankshaft 75 connected to the pistons 71, such that actuating the plurality of pistons 71 with the combustion reactions actuates the crankshaft 75.

In step 1470, the exhaust valves 69 control the amount of exhaust gases that are passed from the cylinders 15 to the exhaust manifold 19. The exhaust valves 69 are actuated by an exhaust camshaft 65, which includes a plurality of cams 93 that serve to actuate each exhaust valve 69. The profile of the cam 93 is shaped to facilitate the motion of the exhaust valves 69. In this regard, the cam 93 protrudes at points where the exhaust valve 69 is actuated downwards, and recedes at points where the exhaust valve 69 is to be closed to prevent fluid communication between a particular cylinder 15 and the exhaust manifold 19. Moreover, because each cylinder 15 houses a separate combustion reaction, each exhaust valve 69 will be actuated by a corresponding cam 93 at a separate point in time, defined according to its corresponding cam 93 profile and the rotation speed of the exhaust camshaft 65. As noted above, the exhaust camshaft 65 is rotationally linked to the crankshaft 75, such that power is siphoned from the crankshaft 75 to rotate the exhaust camshaft 65 and actuate the exhaust valves 69.

Steps 1480-1520, below, relate to operating the engine 11 in a typical engine operating mode or a rebreathe engine operating mode. In particular, step 1480 involves the ECU 57 coordinating the operations of the intake valves 67, exhaust valves 69, and fuel injectors 61 to operate the engine 11 in a typical or rebreathe engine operating mode. The components are coordinated to actuate according to the requested IMEP and engine rotation speed as discussed in relation to FIG. 8. Steps 1490 and 1500 correspond to coordinating the operation of the various engine 11 components according to a typical engine operating mode. On the other hand, steps 1510 and 1520 correspond to coordinating the operation of the various engine 11 components according to a rebreathe engine operating mode.

Specifically, in step 1490 the exhaust valves 69 are controlled to actuate after intake valves 67 are operated. Step 1510 includes controlling the exhaust valves 69 to actuate both during and after the intake valves 67 are actuated. Thus, step 1490 corresponds to the typical engine operating mode due to the progression of operating the intake valves 67 prior to the exhaust valves 69. Step 1510 corresponds to the rebreathe engine operating mode, where exhaust gases are reintroduced into the cylinder 15 by way of the exhaust valves 69 during the intake phase of the engine cycle (i.e., during the operation of the intake valves 67).

Step 1500, which corresponds to the typical engine operating mode by virtue of following step 1490, corresponds to the ECU 57 controlling the fuel injectors to operate according to a retarded timing. In contrast, step 1520, which corresponds to the rebreathe engine operating mode by virtue of following step 1510, corresponds to the ECU 57 controlling the fuel injectors to operate according to an advanced timing. The "advanced timing" and "retarded timing" refer to FIG. 12 and the SOI timing depicted therein. In this regard, FIG. 12 depicts that a pilot SOI line 175 and a main SOI line 183 have an average magnitude that is decreased, corresponding to an overall advanced timing, during the rebreathe engine operating mode. During the typical engine operating mode, the average magnitudes of the main SOI line 183 and the pilot SOI line 175 are increased, corresponding to a retarded timing. As discussed above in relation to FIGS. 2A-2D, the timing of the engine 11 is determined according to the position of the crankshaft 75. A retarded timing refers to operating a component at a time later in the engine cycle compared to an advanced timing, and an advanced timing refers to operating a component earlier in the engine cycle compared to a retarded timing.

Upon coordinating the operations of the engine 11 components to operate in either the typical engine operating mode or the rebreathe engine operating mode, the method of FIG. 14 restarts. The method of FIG. 14 is repeated by creating combustion reactions within the engine 11 according to the typical engine operating mode or the rebreathe engine operating mode. Such is depicted by the line connecting the "end" of the method of FIG. 14 to step 1420, where a gas mixture is supplied to the plurality of cylinders.

Embodiments of the present disclosure may provide at least one of the following advantages. As a result of the increased temperature of the Gasoline Oxidation Catalyst (GOC) and the Selective Catalytic Removal (SCR) catalyst during the rebreathe engine operating mode, an engine operating in the rebreathe engine operating mode will have decreased NMHC, CO, NOx, and EO smoke output. Thus, an engine equipped with both a rebreathe engine operating mode and a typical engine operating mode can flexibly transition between operating modes, which ensures that the engine is continuously operated at the parameters suitable for emission efficient combustion. In addition, transitioning between engine operating modes occurs with minimal changes to the output torque and noise level of the engine, such that a user of the engine will not be interrupted by the change in engine operating modes.

Although only a few example embodiments have been described in detail above, those skilled in the art will readily appreciate that many modifications are possible in the example embodiments without materially departing from this invention. In addition, many modifications will be appreciated by those skilled in the art to adapt a particular instrument, situation, or material to embodiments of the disclosure without departing from the essential scope thereof. Accordingly, all such modifications are intended to be included within the scope of this disclosure as defined in the following claims.

Furthermore, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed is:

1. An engine, comprising:
    a plurality of pistons configured to be actuated by combustion reactions within the engine, where the combustion reactions create exhaust gases;
    a crankshaft configured to be actuated by the plurality of pistons;
    a plurality of cylinders, each cylinder being configured to house a corresponding piston of the plurality of pistons and form a containment boundary for a corresponding combustion reaction of the combustion reactions;
    an intake manifold configured to supply a gas mixture to the plurality of cylinders;
    a plurality of intake valves that are each configured to form a controlled fluid passageway for passing the gas mixture from the intake manifold to a corresponding cylinder of the plurality of cylinders;
    a fuel rail connected to a plurality of fuel injectors that are each configured to inject fuel into a corresponding cylinder of the plurality of cylinders, where the injected fuel is combined with the gas mixture to form a fuel mixture that is combusted in the corresponding cylinder during the combustion reaction;
    an exhaust manifold configured to receive the exhaust gases from each cylinder of the plurality of cylinders and combine the exhaust gases into an exhaust stream;
    a plurality of exhaust valves that are each configured to form a controlled fluid passageway for passing the exhaust gases from a corresponding cylinder of the plurality of cylinders to the exhaust manifold;
    an Electronic Control Unit (ECU) configured to coordinate operations of the intake valves, the exhaust valves, and the fuel injectors based upon a position of the crankshaft in such a manner that the ECU controls the engine to operate in at least two modes including a typical engine operating mode and a rebreathe engine operating mode,
        wherein the typical engine operating mode comprises the ECU controlling the exhaust valves to be actuated after the intake valves are actuated, and the rebreathe engine operating mode comprises the ECU controlling the exhaust valves to be actuated both during and after the intake valves are actuated, and
        wherein the ECU is configured to control a Start of Injection (SOI) of the fuel injectors to be retarded during the typical engine operating mode, relative to the SOI of the fuel injectors during the rebreathe engine operating mode, and
        wherein the ECU controls the SOI of the fuel injectors to be advanced during the rebreathe engine operating mode, relative to the SOI of the fuel injectors during the typical engine operating mode.

2. The engine of claim 1, wherein the ECU is configured to retard the SOI of the fuel during a period of time when the ECU is controlling the engine to exit the rebreathe engine operating mode.

3. The engine of claim 1, wherein the ECU is further configured to control a high-pressure fuel pump to maintain a constant pressure in the fuel rail before, during, and after the ECU controls the engine to exit the rebreathe engine operating mode.

4. The engine of claim 1, wherein the ECU is further configured to increase a duration of the operation of each fuel injector of the plurality of fuel injectors such that the fuel injectors spray additional fuel into the cylinders during a period of time when the ECU is controlling the engine to exit the rebreathe engine operating mode.

5. The engine of claim 1, wherein the ECU is further configured to control a high-pressure fuel pump to lower a fuel pressure of the fuel rail prior to controlling the engine to exit the rebreathe engine operating mode.

6. The engine of claim 1, further comprising:
    an intake line configured to receive air from an external environment of the engine;
    an exhaust pipe configured to receive the exhaust stream from the exhaust manifold and supply at least part of the exhaust stream to the external environment of the engine;
    an Exhaust Gas Recirculation (EGR) line, connected to the exhaust pipe and the intake line, that is configured to receive a portion of the exhaust gas stream from the exhaust manifold, and
    an EGR valve configured to control a flow of the portion of the exhaust gas stream in the EGR line.

7. The engine of claim 6, wherein the ECU is further configured to control the EGR valve to a reduced aperture before controlling the engine to operate in the rebreathe engine operating mode.

8. The engine of claim 7, wherein the ECU is further configured to control the EGR valve to maintain the reduced aperture until the ECU controls the engine to operate in the rebreathe engine operating mode.

9. The engine of claim 6, wherein the ECU is further configured to control the EGR valve to gradually open after the ECU has controlled the engine to exit the rebreathe engine operating mode.

10. The engine of claim 1, wherein the ECU is further configured to advance a pilot SOI after the ECU has controlled the engine to exit the rebreathe engine operating mode.

11. The engine of claim 1, further comprising:
a plurality of camshafts, each camshaft comprising a plurality of cams and each cam being configured to actuate a corresponding intake valve or a corresponding exhaust valve;
wherein each cam of the plurality of cams comprises an inner lobe and an outer lobe, the inner lobe being associated with the rebreathe engine operating mode and the outer lobe being associated with the typical engine operating mode;
wherein the ECU is configured to facilitate a transition between the typical engine operating mode and the rebreathe engine operating mode by controlling whether only the outer lobes of the cams or both the outer lobes and the inner lobes of the cams actuate the corresponding exhaust valves.

12. A method for operating an engine, comprising:
housing a plurality of pistons in a plurality of cylinders, where each cylinder houses a corresponding piston of the plurality of pistons and forms a containment boundary for a corresponding combustion reaction;
supplying a gas mixture to the plurality of cylinders with an intake manifold, where an amount of the gas mixture to be supplied to each cylinder of the plurality of cylinders is controlled with a corresponding intake valve of a plurality of intake valves;
injecting fuel with a plurality of fuel injectors, connected to a fuel rail, where each of the injectors inject fuel into a corresponding cylinder of the plurality of cylinders;
combining the injected fuel with the gas mixture to form a fuel mixture;
combusting the fuel mixture during combustion reactions that are contained inside of the engine by the plurality of cylinders, thereby creating exhaust gases;
actuating the plurality of pistons with the combustion reactions, thereby actuating a crankshaft connected to the plurality of pistons;
controlling, with exhaust valves, an amount of the exhaust gases passed from a corresponding cylinder of the plurality of cylinders to an exhaust manifold that combines the exhaust gases into an exhaust stream;
coordinating operations of the intake valves, the exhaust valves, and the fuel injectors with an Electronic Control Unit (ECU) based upon a position of the crankshaft in such a manner that the ECU controls the engine to operate in at least two modes including a typical engine operating mode and a rebreathe engine operating mode, wherein the typical engine operating mode comprises controlling the exhaust valves with the ECU to be actuated after the intake valves are actuated, and the rebreathe engine operating mode comprises controlling the exhaust valves with the ECU to be actuated both during and after the intake valves are actuated, and
wherein a Start of Injection (SOI) of the fuel injectors is controlled by the ECU to be retarded during the typical engine operating mode, relative to the SOI of the fuel injectors during the rebreathe engine operating mode, and
wherein the SOI of the fuel injectors is controlled by the ECU to be advanced during the rebreathe engine operating mode, relative to the SOI of the fuel injectors during the typical engine operating mode.

13. The method of claim 12, further comprising: retarding the SOI of the fuel injectors with the ECU during a period of time when the ECU is controlling the engine to exit the rebreathe engine operating mode.

14. The method of claim 12 further comprising: controlling a high-pressure fuel pump with the ECU to maintain a constant pressure in the fuel rail before, during, and after the ECU controls the engine to exit the rebreathe engine operating mode.

15. The method of claim 12 further comprising: increasing a duration of the operation of each fuel injector of the plurality of fuel injectors with the ECU such that the fuel injectors spray additional fuel into the cylinders during a period of time when the ECU is controlling the engine to exit the rebreathe engine operating mode.

16. The method of claim 12 further comprising: controlling a high-pressure fuel pump to lower a fuel pressure of the fuel rail prior to controlling the engine to exit the rebreathe engine operating mode.

17. The method of claim 12, further comprising:
receiving air from an external environment of the engine with an intake line;
receiving the exhaust stream from the exhaust manifold and supplying at least part of the exhaust stream to the external environment of the engine with an exhaust pipe;
receiving a portion of the exhaust gas stream from the exhaust pipe with an Exhaust Gas Recirculation (EGR) line, connected to the exhaust pipe and the intake line, and
controlling a flow of the portion of the exhaust gas stream in the EGR line with an EGR valve.

18. The method of claim 17, further comprising: controlling the EGR valve to a reduced aperture with the ECU before controlling the engine to operate in the rebreathe engine operating mode.

19. The method of claim 17 further comprising: controlling the SOI, a fuel pressure, a fuel quantity, and the EGR flow while controlling the engine to exit the rebreathe engine operating mode, where the control depends on a difference between a desired intake manifold pressure and an actual intake manifold pressure.

20. The method of claim 17, further comprising: advancing a pilot SOI with the ECU after the ECU has controlled the engine to exit the rebreathe engine operating mode.

* * * * *